US012322400B2

(12) United States Patent
Chebiyyam et al.

(10) Patent No.: US 12,322,400 B2
(45) Date of Patent: *Jun. 3, 2025

(54) STEREO PARAMETERS FOR STEREO DECODING

(71) Applicant: QUALCOMM Incorporated, San Diego, CA (US)

(72) Inventors: Venkata Subrahmanyam Chandra Sekhar Chebiyyam, Seattle, WA (US); Venkatraman Atti, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/513,188

(22) Filed: Nov. 17, 2023

(65) Prior Publication Data

US 2024/0161757 A1 May 16, 2024
US 2024/0420704 A9 Dec. 19, 2024

Related U.S. Application Data

(63) Continuation of application No. 17/556,981, filed on Dec. 20, 2021, now Pat. No. 11,823,689, which is a (Continued)

(51) Int. Cl.
*G10L 19/08* (2013.01)
*G10L 19/005* (2013.01)
(Continued)

(52) U.S. Cl.
CPC .......... *G10L 19/008* (2013.01); *G10L 19/005* (2013.01); *H04S 1/007* (2013.01); *H04S 2400/01* (2013.01); *H04S 2400/05* (2013.01)

(58) Field of Classification Search
CPC ...... G10L 19/008; G10L 19/005; H04S 1/007
See application file for complete search history.

(56) References Cited

U.S. PATENT DOCUMENTS 10,224,045 B2 3/2019 Chebiyyam
10,783,894 B2 9/2020 Chebiyyam et al.
(Continued)

FOREIGN PATENT DOCUMENTS

CN 102388417 A 3/2012
CN 102428513 A 4/2012
(Continued)

OTHER PUBLICATIONS

3GPP TS 26.402: "3rd Generation Partnership Project, Technical Specification Group Services and System Aspects, General Audio Codec Audio Processing Functions, Enhanced aacPlus General Audio Codec, Additional Decoder Tools (Release 6)", 3GPP TS 26.402, V6.1.0, Sep. 2005, pp. 1-17.
(Continued)

*Primary Examiner* — Olisa Anwah
(74) *Attorney, Agent, or Firm* — QUALCOMM Incorporated; Espartaco Diaz Hidalgo

(57) ABSTRACT

An apparatus includes a receiver and a decoder. The receiver is configured to receive a bitstream that includes a first frame and a second frame. The first frame includes a first portion of a mid channel and a first quantized stereo parameter. The second frame includes a second portion of the mid channel and a second quantized stereo parameter. The decoder is configured to generate a first portion of a channel based on the first portion of the mid channel and the first quantized stereo parameter. The decoder is configured to, in response to the second frame being unavailable for decoding operations, estimate the second quantized stereo parameter based on stereo parameters of one or more preceding frames and generate a second portion of the channel based on the
(Continued)

estimated second quantized stereo parameter. The second portion of the channel corresponds to a decoded version of the second frame.

17 Claims, 9 Drawing Sheets

Related U.S. Application Data continuation of application No. 16/918,887, filed on Jul. 1, 2020, now Pat. No. 11,205,436, which is a continuation of application No. 16/272,903, filed on Feb. 11, 2019, now Pat. No. 10,783,894, which is a continuation of application No. 15/962,834, filed on Apr. 25, 2018, now Pat. No. 10,224,045.

(60) Provisional application No. 62/505,041, filed on May 11, 2017.

(51) Int. Cl.

| | |
|---|---|
| ***G10L 19/008*** | (2013.01) |
| ***H04S 1/00*** | (2006.01) |

(56) References Cited

U.S. PATENT DOCUMENTS

| | | | | |
|---|---|---|---|---|
| 11,205,436 | B2 | 12/2021 | Chebiyyam et al. | |
| 11,823,689 | B2 | 11/2023 | Chebiyyam et al. | |
| 2010/0280822 | A1 | 11/2010 | Yoshida | |
| 2012/0065984 | A1* | 3/2012 | Yamanashi | G10L 19/005 704/E21.001 |
| 2012/0275604 | A1 | 11/2012 | Vos et al. | |
| 2013/0142340 | A1 | 6/2013 | Sehlstrom et al. | |
| 2014/0016785 | A1 | 1/2014 | Neuendorf et al. | |
| 2017/0365264 | A1 | 12/2017 | Disch et al. | |
| 2018/0233154 | A1 | 8/2018 | Vaillancourt et al. | |

FOREIGN PATENT DOCUMENTS

| | | | |
|---|---|---|---|
| CN | 103493127 | A | 1/2014 |
| CN | 103718466 | A | 4/2014 |
| EP | 1746751 | A1 | 1/2007 |
| EP | 2654039 | A1 | 10/2013 |
| WO | 2016142376 | A1 | 9/2016 |
| WO | 2018136167 | | 7/2018 |

OTHER PUBLICATIONS

ETSI TS 126 445: "Universal Mobile Telecommunications System (UMTS); LTE; EVS Codec Detailed Algorithmic Description", 3GPP TS 26.445, Version 12.0.0, Release 12, Nov. 2014, 627 Pages.

International Search Report and Written Opinion—PCT/US2018/029872—ISA/EPO—Aug. 21, 2018.

ISO/IEC FDIS 23003-3:2011(E): "Information Technology—MPEG Audio Technologies—Part 3: Unified Speech and Audio Coding", ISO/IEC JTC 1/SC 29/WG 11, Secretariat: JISC, Sep. 20, 2011 (Sep. 20, 2011), 291 Pages.

Taiwan Search Report—TW107114648—TIPO—Mar. 11, 2022.

Taiwan Search Report—TW111148802—TIPO—Oct. 9, 2023.

Taiwan Search Report—TW111148803—TIPO—Oct. 9, 2023.

* cited by examiner

STEREO PARAMETERS FOR STEREO DECODING

I. CROSS-REFERENCE TO RELATED APPLICATIONS

The present application claims priority from and is a continuation application of U.S. patent application Ser. No. 17/556,981, filed Dec. 20, 2021, entitled "STEREO PARAMETERS FOR STEREO DECODING," and issued as U.S. Pat. No. 11,823,689 on Nov. 21, 2023, which claims priority from and is a continuation application of U.S. patent application Ser. No. 16/918,887, filed Jul. 1, 2020, entitled "STEREO PARAMETERS FOR STEREO DECODING," and issued as U.S. Pat. No. 11,205,436 on Dec. 21, 2021, which claims priority from and is a continuation application of U.S. patent application Ser. No. 16/272,903, now U.S. Pat. No. 10,783,894, filed Feb. 11, 2019, and entitled "STEREO PARAMETERS FOR STEREO DECODING," which claims priority from and is a continuation application of U.S. patent application Ser. No. 15/962,834, now U.S. Pat. No. 10,224,045, filed Apr. 25, 2018, and entitled "STEREO PARAMETERS FOR STEREO DECODING," which claims priority from U.S. Provisional Patent Application No. 62/505,041, entitled "STEREO PARAMETERS FOR STEREO DECODING," filed May 11, 2017, the contents of each of which is incorporated by reference in its entirety.

II. FIELD

The present disclosure is generally related to decoding audio signals.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

A computing device may include or may be coupled to multiple microphones to receive audio signals. Generally, a sound source is closer to a first microphone than to a second microphone of the multiple microphones. Accordingly, a second audio signal received from the second microphone may be delayed relative to a first audio signal received from the first microphone due to the respective distances of the microphones from the sound source. In other implementations, the first audio signal may be delayed with respect to the second audio signal. In stereo-encoding, audio signals from the microphones may be encoded to generate a mid channel signal and one or more side channel signals. The mid channel signal may correspond to a sum of the first audio signal and the second audio signal. A side channel signal may correspond to a difference between the first audio signal and the second audio signal. The first audio signal may not be aligned with the second audio signal because of the delay in receiving the second audio signal relative to the first audio signal. The delay may be indicated by an encoded shift value (e.g., a stereo parameter) that is transmitted to a decoder. Precise alignment of the first audio signal with the second audio signal enables efficient encoding for transmission to the decoder. However, transmission of high-precision data that indicates the alignment of the audio signals uses increased transmission resources as compared to transmitting low-precision data. Other stereo parameters indicative of characteristics between the first and second audio signal may also be encoded and transmitted to the decoder.

The decoder may reconstruct the first and second audio signals based on at least the mid channel signal and the stereo parameters that are received at the decoder via a bitstream that includes a sequence of frames. Precision at the decoder during audio signal reconstruction may be based on precision of the encoder. For example, the encoded high-precision shift value may be received at the decoder and may enable the decoder to reproduce the delay in reconstructed versions of the first audio signal and the second audio signal with a high precision. If the shift value is unavailable at the decoder, such as when a frame of data transmitted via the bitsteam is corrupted due to noisy transmission conditions, the shift value may be requested and retransmitted to the decoder to enable precise reproduction of the delay between the audio signals. For example, the precision of the decoder in reproducing the delay may exceed an audible perceptivity limitation of humans to perceive a variation in the delay.

IV. SUMMARY

According to one implementation of the present disclosure, an apparatus includes a receiver configured to receive at least a portion of a bitstream. The bitstream includes a first frame and a second frame. The first frame includes a first portion of a mid channel and a first value of a stereo parameter, and the second frame includes a second portion of the mid channel and a second value of the stereo parameter. The apparatus also includes a decoder configured to decode the first portion of the mid channel to generate a first portion of a decoded mid channel. The decoder is also configured to generate a first portion of a left channel based at least on the first portion of the decoded mid channel and the first value of the stereo parameter and to generate a first portion of a right channel based at least on the first portion of the decoded mid channel and the first value of the stereo parameter. The decoder is further configured to, in response to the second frame being unavailable for decoding operations, generate a second portion of the left channel and a second portion of the right channel based at least on the first value of the stereo parameter. The second portion of the left channel and the second portion of the right channel correspond to a decoded version of the second frame.

According to another implementation, a method of decoding a signal includes receiving at least a portion of a bitstream. The bitstream includes a first frame and a second frame. The first frame includes a first portion of a mid channel and a first value of a stereo parameter, and the second frame includes a second portion of the mid channel and a second value of the stereo parameter. The method also includes decoding the first portion of the mid channel to generate a first portion of a decoded mid channel. The method further includes generating a first portion of a left channel based at least on the first portion of the decoded mid channel and the first value of the stereo parameter and generating a first portion of a right channel based at least on the first portion of the decoded mid channel and the first value of the stereo parameter. The method also includes, in response to the second frame being unavailable for decoding operations, generating a second portion of the left channel and a second portion of the right channel based at least on the first value of the stereo parameter. The second portion of the left channel and the second portion of the right channel correspond to a decoded version of the second frame.

According to another implementation, a non-transitory computer-readable medium includes instructions that, when executed by a processor within a decoder, cause the processor to perform operations including receiving at least a portion of a bitstream. The bitstream includes a first frame and a second frame. The first frame includes a first portion of a mid channel and a first value of a stereo parameter, and the second frame includes a second portion of the mid channel and a second value of the stereo parameter. The operations also include decoding the first portion of the mid channel to generate a first portion of a decoded mid channel. The operations further include generating a first portion of a left channel based at least on the first portion of the decoded mid channel and the first value of the stereo parameter and generating a first portion of a right channel based at least on the first portion of the decoded mid channel and the first value of the stereo parameter. The operations also include, in response to the second frame being unavailable for decoding operations, generating a second portion of the left channel and a second portion of the right channel based at least on the first value of the stereo parameter. The second portion of the left channel and the second portion of the right channel corresponds to a decoded version of the second frame.

According to another implementation, an apparatus includes means for receiving at least a portion of a bitstream. The bitstream includes a first frame and a second frame. The first frame includes a first portion of a mid channel and a first value of a stereo parameter, and the second frame includes a second portion of the mid channel and a second value of the stereo parameter. The apparatus also includes means for decoding the first portion of the mid channel to generate a first portion of a decoded mid channel. The apparatus further includes means for generating a first portion of a left channel based at least on the first portion of the decoded mid channel and the first value of the stereo parameter and means for generating a first portion of a right channel based at least on the first portion of the decoded mid channel and the first value of the stereo parameter. The apparatus also includes means for generating, in response to the second frame being unavailable for decoding operations, a second portion of the left channel and a second portion of the right channel based at least on the first value of the stereo parameter. The second portion of the left channel and the second portion of the right channel correspond to a decoded version of the second frame.

According to another implementation, an apparatus includes a receiver configured to receive at least a portion of a bitstream from an encoder. The bitstream includes a first frame and a second frame. The first frame includes a first portion of a mid channel and a first value of a stereo parameter. The second frame includes a second portion of the mid channel and a second value of the stereo parameter. The apparatus also includes a decoder configured to decode the first portion of the mid channel to generate a first portion of a decoded mid channel. The decoder is also configured to perform a transform operation on the first portion of the decoded mid channel to generate a first portion of a decoded frequency-domain mid channel. The decoder is further configured to upmix the first portion of the decoded frequency-domain mid channel to generate a first portion of a left frequency-domain channel and a first portion of a right frequency-domain channel. The decoder is also configured to generate a first portion of a left channel based at least on the first portion of the left frequency-domain channel and the first value of the stereo parameter. The decoder is further configured to generate a first portion of a right channel based at least on the first portion of the right frequency-domain channel and the first value of the stereo parameter. The decoder is also configured to determine that the second frame is unavailable for decoding operations. The decoder is further configured to generate, based at least on the first value of the stereo parameter, a second portion of the left channel and a second portion of the right channel in response to determining that the second frame is unavailable. The second portion of the left channel and the second portion of the right channel correspond to a decoded version of the second frame.

According to another implementation, a method of decoding a signal includes receiving, at a decoder, at least a portion of a bitstream from an encoder. The bitstream includes a first frame and a second frame. The first frame includes a first portion of a mid channel and a first value of a stereo parameter. The second frame includes a second portion of the mid channel and a second value of the stereo parameter. The method also includes decoding the first portion of the mid channel to generate a first portion of a decoded mid channel. The method further include performing a transform operation on the first portion of the decoded mid channel to generate a first portion of a decoded frequency-domain mid channel. The method also includes upmixing the first portion of the decoded frequency-domain mid channel to generate a first portion of a left frequency-domain channel and a first portion of a right frequency-domain channel. The method further includes generating a first portion of a left channel based at least on the first portion of the left frequency-domain channel and the first value of the stereo parameter. The method further includes generating a first portion of a right channel based at least on the first portion of the right frequency-domain channel and the first value of the stereo parameter. The method also includes determining that the second frame is unavailable for decoding operations. The method further includes generating, based at least on the first value of the stereo parameter, a second portion of the left channel and a second portion of the right channel in response to determining that the second frame is unavailable. The second portion of the left channel and the second portion of the right channel correspond to a decoded version of the second frame.

According to another implementation, a non-transitory computer-readable medium includes instructions that, when executed by a processor within a decoder, cause the processor to perform operations including receiving at least a portion of a bitstream from an encoder. The bitstream includes a first frame and a second frame. The first frame includes a first portion of a mid channel and a first value of a stereo parameter. The second frame includes a second portion of the mid channel and a second value of the stereo parameter. The operations also include decoding the first portion of the mid channel to generate a first portion of a decoded mid channel. The operations further include performing a transform operation on the first portion of the decoded mid channel to generate a first portion of a decoded frequency-domain mid channel. The operations also include upmixing the first portion of the decoded frequency-domain mid channel to generate a first portion of a left frequency-domain channel and a first portion of a right frequency-domain channel. The operations further include generating a first portion of a left channel based at least on the first portion of the left frequency-domain channel and the first value of the stereo parameter. The operations further include generating a first portion of a right channel based at least on the first portion of the right frequency-domain channel and the first value of the stereo parameter. The operations also include determining that the second frame is unavailable for decoding operations. The operations further include generating, based at least on the first value of the stereo parameter, a second portion of the left channel and a second portion of the right channel in response to determining that the second frame is unavailable. The second portion of the left channel and the second portion of the right channel correspond to a decoded version of the second frame.

According to another implementation, an apparatus includes means for receiving at least a portion of a bitstream from an encoder. The bitstream includes a first frame and a second frame. The first frame includes a first portion of a mid channel and a first value of a stereo parameter. The second frame includes a second portion of the mid channel and a second value of the stereo parameter. The apparatus also includes means for decoding the first portion of the mid channel to generate a first portion of a decoded mid channel. The apparatus also includes means for performing a transform operation on the first portion of the decoded mid channel to generate a first portion of a decoded frequency-domain mid channel. The apparatus also includes means for upmixing the first portion of the decoded frequency-domain mid channel to generate a first portion of a left frequency-domain channel and a first portion of a right frequency-domain channel. The apparatus also includes means for generating a first portion of a left channel based at least on the first portion of the left frequency-domain channel and the first value of the stereo parameter. The apparatus also includes means for generating a first portion of a right channel based at least on the first portion of the right frequency-domain channel and the first value of the stereo parameter. The apparatus also includes means for determining that the second frame is unavailable for decoding operations. The apparatus also includes means for generating, based at least on the first value of the stereo parameter, a second portion of the left channel and a second portion of the right channel in response to a determination that the second frame is unavailable. The second portion of the left channel and the second portion of the right channel correspond to a decoded version of the second frame.

According to another implementation, an apparatus includes a receiver and a decoder. The receiver is configured to receive a bitstream that includes an encoded mid channel and a quantized value representing a shift between a reference channel associated with an encoder and a target channel associated with the encoder. The quantized value is based on a value of the shift. The value of the shift is associated with the encoder and has a greater precision than the quantized value. The decoder is configured to decode the encoded mid channel to generate a decoded mid channel and to generate a first channel based on the decoded mid channel. The decoder is further configured to generate a second channel based on the decoded mid channel and the quantized value. The first channel corresponds to the reference channel and the second channel corresponds to the target channel.

According to another implementation, a method of decoding a signal includes receiving, at a decoder, a bitstream including a mid channel and a quantized value representing a shift between a reference channel associated with an encoder and a target channel associated with the encoder. The quantized value is based on a value of the shift. The value is associated with the encoder and has a greater precision than the quantized value. The method also includes decoding the mid channel to generate a decoded mid channel. The method further includes generating a first channel based on the decoded mid channel and generating a second channel based on the decoded mid channel and the quantized value. The first channel corresponds to the reference channel and the second channel corresponds to the target channel.

According to another implementation, a non-transitory computer-readable medium includes instructions that, when executed by a processor within a decoder, cause the processor to perform operations including receiving, at a decoder, a bitstream including a mid channel and a quantized value representing a shift between a reference channel associated with an encoder and a target channel associated with the encoder. The quantized value is based on a value of the shift. The value is associated with the encoder and has a greater precision than the quantized value. The operations also include decoding the mid channel to generate a decoded mid channel. The operations further include generating a first channel based on the decoded mid channel and generating a second channel based on the decoded mid channel and the quantized value. The first channel corresponds to the reference channel and the second channel corresponds to the target channel.

According to another implementation, an apparatus includes means for receiving, at a decoder, a bitstream including a mid channel and a quantized value representing a shift between a reference channel associated with an encoder and a target channel associated with the encoder. The quantized value is based on a value of the shift. The value is associated with the encoder and has a greater precision than the quantized value. The apparatus also includes means for decoding the mid channel to generate a decoded mid channel. The apparatus further includes means for generating a first channel based on the decoded mid channel and means for generating a second channel based on the decoded mid channel and the quantized value. The first channel corresponds to the reference channel and the second channel corresponds to the target channel.

According to another implementation, an apparatus includes a receiver configured to receive a bitstream from an encoder. The bitstream includes a mid channel and a quantized value representing a shift between a reference channel associated with the encoder and a target channel associated with the encoder. The quantized value is based on a value of the shift that has a greater precision than the quantized value. The apparatus also includes a decoder configured to decode the mid channel to generate a decoded mid channel. The decoder is also configured to perform a transform operation on the decoded mid channel to generate a decoded frequency-domain mid channel. The decoder is further configured to upmix the decoded frequency-domain mid channel to generate a first frequency-domain channel and a second frequency-domain channel. The decoder is also configured to generate a first channel based on the first frequency-domain channel. The first channel corresponds to the reference channel. The decoder is further configured to generate a second channel based on the second frequency-domain channel. The second channel corresponds to the target channel. The second frequency-domain channel is shifted in the frequency domain by the quantized value if the quantized value corresponds to a frequency-domain shift, and a time-domain version of the second frequency-domain channel is shifted by the quantized value if the quantized value corresponds to a time-domain shift.

According to another implementation, a method includes receiving, at a decoder, a bitstream from an encoder. The bitstream includes a mid channel and a quantized value representing a shift between a reference channel associated with the encoder and a target channel associated with the encoder. The quantized value is based on a value of the shift that has a greater precision than the quantized value. The method also includes decoding the mid channel to generate a decoded mid channel. The method further includes performing a transform operation on the decoded mid channel to generate a decoded frequency-domain mid channel. The method also includes upmixing the decoded frequency-domain mid channel to generate a first frequency-domain channel and a second frequency-domain channel. The method also includes generating a first channel based on the first frequency-domain channel. The first channel corresponds to the reference channel. The method further includes generating a second channel based on the second frequency-domain channel. The second channel corresponds to the target channel. The second frequency-domain channel is shifted in the frequency domain by the quantized value if the quantized value corresponds to a frequency-domain shift, and a time-domain version of the second frequency-domain channel is shifted by the quantized value if the quantized value corresponds to a time-domain shift.

According to another implementation, a non-transitory computer-readable medium includes instructions for decoding a signal. The instructions, when executed by a processor within a decoder, cause the processor to perform operations including receiving a bitstream from an encoder. The bitstream includes a mid channel and a quantized value representing a shift between a reference channel associated with the encoder and a target channel associated with the encoder. The quantized value is based on a value of the shift that has a greater precision than the quantized value. The operations also include decoding the mid channel to generate a decoded mid channel. The operations further include performing a transform operation on the decoded mid channel to generate a decoded frequency-domain mid channel. The operations also include upmixing the decoded frequency-domain mid channel to generate a first frequency-domain channel and a second frequency-domain channel. The operations also include generating a first channel based on the first frequency-domain channel. The first channel corresponds to the reference channel. The operations further include generating a second channel based on the second frequency-domain channel. The second channel corresponds to the target channel. The second frequency-domain channel is shifted in the frequency domain by the quantized value if the quantized value corresponds to a frequency-domain shift, and a time-domain version of the second frequency-domain channel is shifted by the quantized value if the quantized value corresponds to a time-domain shift.

According to another implementation, an apparatus includes means for receiving a bitstream from an encoder. The bitstream includes a mid channel and a quantized value representing a shift between a reference channel associated with the encoder and a target channel associated with the encoder. The quantized value is based on a value of the shift that has a greater precision than the quantized value. The apparatus also includes means for decoding the mid channel to generate a decoded mid channel. The apparatus also includes means for performing a transform operation on the decoded mid channel to generate a decoded frequency-domain mid channel. The apparatus also includes means for upmixing the decoded frequency-domain mid channel to generate a first frequency-domain channel and a second frequency-domain channel. The apparatus also includes means for generating a first channel based on the first frequency-domain channel. The first channel corresponds to the reference channel. The apparatus also includes means for generating a second channel based on the second frequency-domain channel. The second channel corresponds to the target channel. The second frequency-domain channel is shifted in the frequency domain by the quantized value if the quantized value corresponds to a frequency-domain shift, and a time-domain version of the second frequency-domain channel is shifted by the quantized value if the quantized value corresponds to a time-domain shift.

Other implementations, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Figure 1:
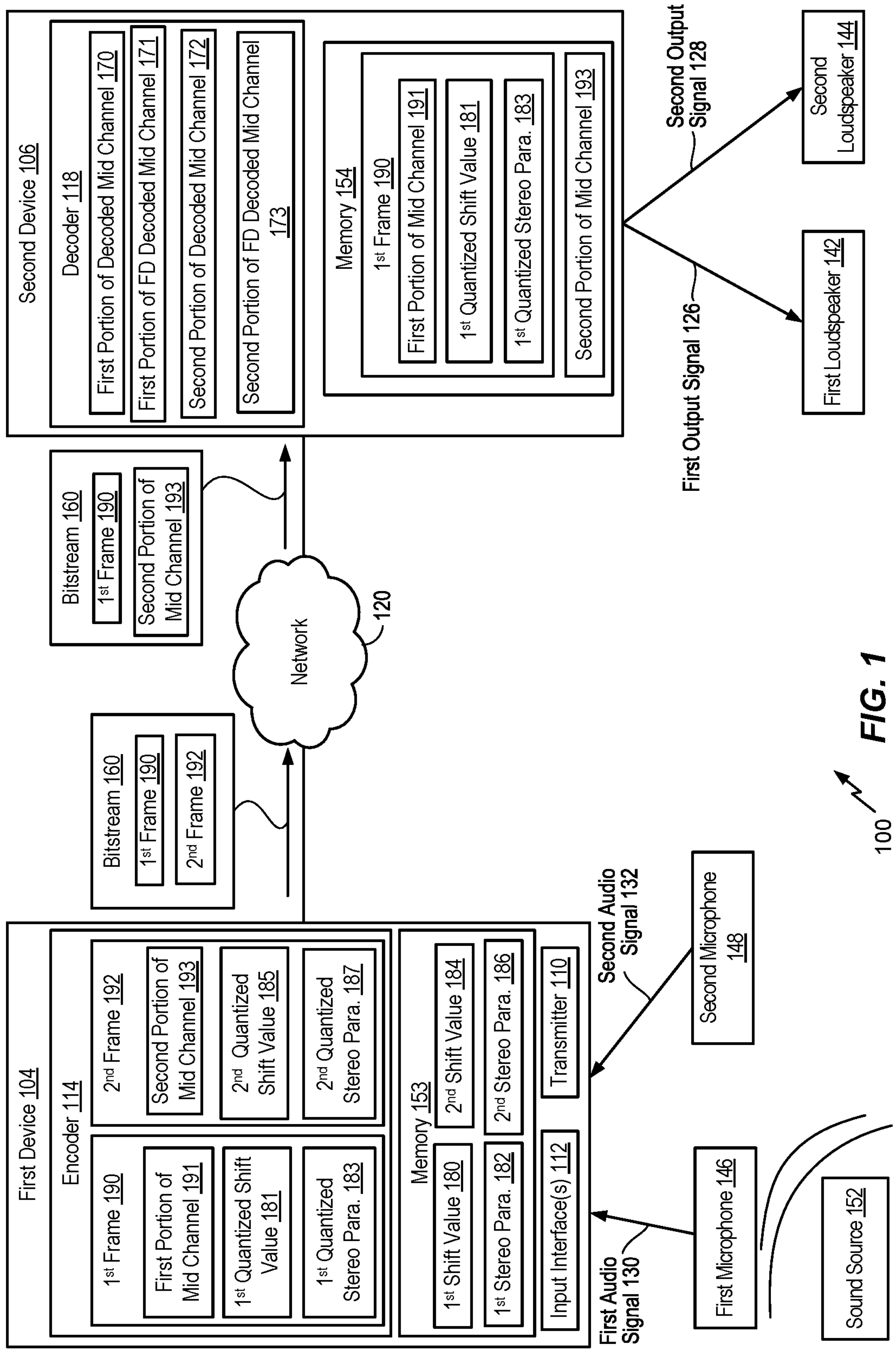
FIG. 1 is a block diagram of a particular illustrative example of a system that includes a decoder operable to estimate stereo parameters for missing frames and to decode audio signals using quantized stereo parameters.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms “a,” “an,” and “the” are intended to include the plural forms as well, unless the context clearly indicates otherwise. It may be further understood that the terms “comprises” and “comprising” may be used interchangeably with “includes” or “including.” Additionally, it will be understood that the term “wherein” may be used interchangeably with “where.” As used herein, an ordinal term (e.g., “first,” “second,” “third,” etc.) used to modify an element, such as a structure, a component, an operation, etc., does not by itself indicate any priority or order of the element with respect to another element, but rather merely distinguishes the element from another element having a same name (but for use of the ordinal term). As used herein, the term “set” refers to one or more of a particular element, and the term “plurality” refers to multiple (e.g., two or more) of a particular element.

In the present disclosure, terms such as "determining", "calculating", "shifting", "adjusting", etc. may be used to describe how one or more operations are performed. It should be noted that such terms are not to be construed as limiting and other techniques may be utilized to perform similar operations. Additionally, as referred to herein, "generating", "calculating", "using", "selecting", "accessing", and "determining" may be used interchangeably. For example, "generating", "calculating", or "determining" a parameter (or a signal) may refer to actively generating, calculating, or determining the parameter (or the signal) or may refer to using, selecting, or accessing the parameter (or signal) that is already generated, such as by another component or device.

Systems and devices operable to encode multiple audio signals are disclosed. A device may include an encoder configured to encode the multiple audio signals. The multiple audio signals may be captured concurrently in time using multiple recording devices, e.g., multiple microphones. In some examples, the multiple audio signals (or multi-channel audio) may be synthetically (e.g., artificially) generated by multiplexing several audio channels that are recorded at the same time or at different times. As illustrative examples, the concurrent recording or multiplexing of the audio channels may result in a 2-channel configuration (i.e., Stereo: Left and Right), a 5.1 channel configuration (Left, Right, Center, Left Surround, Right Surround, and the low frequency emphasis (LFE) channels), a 7.1 channel configuration, a 7.1+4 channel configuration, a 22.2 channel configuration, or a N-channel configuration.

Audio capture devices in teleconference rooms (or telepresence rooms) may include multiple microphones that acquire spatial audio. The spatial audio may include speech as well as background audio that is encoded and transmitted. The speech/audio from a given source (e.g., a talker) may arrive at the multiple microphones at different times depending on how the microphones are arranged as well as where the source (e.g., the talker) is located with respect to the microphones and room dimensions. For example, a sound source (e.g., a talker) may be closer to a first microphone associated with the device than to a second microphone associated with the device. Thus, a sound emitted from the sound source may reach the first microphone earlier in time than the second microphone. The device may receive a first audio signal via the first microphone and may receive a second audio signal via the second microphone.

Mid-side (MS) coding and parametric stereo (PS) coding are stereo coding techniques that may provide improved efficiency over the dual-mono coding techniques. In dual-mono coding, the Left (L) channel (or signal) and the Right (R) channel (or signal) are independently coded without making use of inter-channel correlation. MS coding reduces the redundancy between a correlated L/R channel-pair by transforming the Left channel and the Right channel to a sum-channel and a difference-channel (e.g., a side channel) prior to coding. The sum signal and the difference signal are waveform coded or coded based on a model in MS coding. Relatively more bits are spent on the sum signal than on the side signal. PS coding reduces redundancy in each sub-band by transforming the L/R signals into a sum signal and a set of side parameters. The side parameters may indicate an inter-channel intensity difference (IID), an inter-channel phase difference (IPD), an inter-channel time difference (ITD), side or residual prediction gains, etc. The sum signal is waveform coded and transmitted along with the side parameters. In a hybrid system, the side-channel may be waveform coded in the lower bands (e.g., less than 2 kilohertz (kHz)) and PS coded in the upper bands (e.g., greater than or equal to 2 kHz) where the inter-channel phase preservation is perceptually less critical. In some implementations, the PS coding may be used in the lower bands also to reduce the inter-channel redundancy before waveform coding.

The MS coding and the PS coding may be done in either the frequency-domain or in the sub-band domain or in the time domain. In some examples, the Left channel and the Right channel may be uncorrelated. For example, the Left channel and the Right channel may include uncorrelated synthetic signals. When the Left channel and the Right channel are uncorrelated, the coding efficiency of the MS coding, the PS coding, or both, may approach the coding efficiency of the dual-mono coding.

Depending on a recording configuration, there may be a temporal shift between a Left channel and a Right channel, as well as other spatial effects such as echo and room reverberation. If the temporal shift and phase mismatch between the channels are not compensated, the sum channel and the difference channel may contain comparable energies, reducing the coding-gains associated with MS or PS techniques. The reduction in the coding-gains may be based on the amount of temporal (or phase) shift. The comparable energies of the sum signal and the difference signal may limit the usage of MS coding in certain frames where the channels are temporally shifted but are highly correlated. In stereo coding, a Mid channel (e.g., a sum channel) and a Side channel (e.g., a difference channel) may be generated based on the following Formula:

$$M=(L+R)/2, S=(L-R)/2, \quad \text{Formula 1}$$

where M corresponds to the Mid channel, S corresponds to the Side channel, L corresponds to the Left channel, and R corresponds to the Right channel.

In some cases, the Mid channel and the Side channel may be generated based on the following Formula:

$$M=c(L+R), S=c(L-R), \quad \text{Formula 2}$$

where c corresponds to a complex value which is frequency dependent.

Generating the Mid channel and the Side channel based on Formula 1 or Formula 2 may be referred to as "downmixing". A reverse process of generating the Left channel and the Right channel from the Mid channel and the Side channel based on Formula 1 or Formula 2 may be referred to as "upmixing".

In some cases, the Mid channel may be based other formulas such as:

$$M=(L+g_D R)/2, \text{ or} \quad \text{Formula 3}$$

$$M=g_1 L+g_2 R \quad \text{Formula 4}$$

where $g_1+g_2=1.0$, and where $g_D$ is a gain parameter. In other examples, the downmix may be performed in bands, where $mid(b)=c_1L(b)+c_2R(b)$, where $c_1$ and $c_2$ are complex numbers, where $side(b)=c_3L(b)-c_4R(b)$, and where $c_3$ and $c_4$ are complex numbers.

An ad-hoc approach used to choose between MS coding or dual-mono coding for a particular frame may include generating a mid signal and a side signal, calculating energies of the mid signal and the side signal, and determining whether to perform MS coding based on the energies. For example, MS coding may be performed in response to determining that the ratio of energies of the side signal and the mid signal is less than a threshold. To illustrate, if a Right channel is shifted by at least a first time (e.g., about 0.001 seconds or 48 samples at 48 kHz), a first energy of the mid signal (corresponding to a sum of the left signal and the right signal) may be comparable to a second energy of the side signal (corresponding to a difference between the left signal and the right signal) for voiced speech frames. When the first energy is comparable to the second energy, a higher number of bits may be used to encode the Side channel, thereby reducing coding efficiency of MS coding relative to dual-mono coding. Dual-mono coding may thus be used when the first energy is comparable to the second energy (e.g., when the ratio of the first energy and the second energy is greater than or equal to the threshold). In an alternative approach, the decision between MS coding and dual-mono coding for a particular frame may be made based on a comparison of a threshold and normalized cross-correlation values of the Left channel and the Right channel.

In some examples, the encoder may determine a mismatch value indicative of an amount of temporal misalignment between the first audio signal and the second audio signal. As used herein, a "temporal shift value", a "shift value", and a "mismatch value" may be used interchangeably. For example, the encoder may determine a temporal shift value indicative of a shift (e.g., the temporal mismatch) of the first audio signal relative to the second audio signal. The temporal mismatch value may correspond to an amount of temporal delay between receipt of the first audio signal at the first microphone and receipt of the second audio signal at the second microphone. Furthermore, the encoder may determine the temporal mismatch value on a frame-by-frame basis, e.g., based on each 20 milliseconds (ms) speech/audio frame. For example, the temporal mismatch value may correspond to an amount of time that a second frame of the second audio signal is delayed with respect to a first frame of the first audio signal. Alternatively, the temporal mismatch value may correspond to an amount of time that the first frame of the first audio signal is delayed with respect to the second frame of the second audio signal.

When the sound source is closer to the first microphone than to the second microphone, frames of the second audio signal may be delayed relative to frames of the first audio signal. In this case, the first audio signal may be referred to as the "reference audio signal" or "reference channel" and the delayed second audio signal may be referred to as the "target audio signal" or "target channel". Alternatively, when the sound source is closer to the second microphone than to the first microphone, frames of the first audio signal may be delayed relative to frames of the second audio signal. In this case, the second audio signal may be referred to as the reference audio signal or reference channel and the delayed first audio signal may be referred to as the target audio signal or target channel.

Depending on where the sound sources (e.g., talkers) are located in a conference or telepresence room or how the sound source (e.g., talker) position changes relative to the microphones, the reference channel and the target channel may change from one frame to another; similarly, the temporal delay value may also change from one frame to another. However, in some implementations, the temporal mismatch value may always be positive to indicate an amount of delay of the "target" channel relative to the "reference" channel. Furthermore, the temporal mismatch value may correspond to a "non-causal shift" value by which the delayed target channel is "pulled back" in time such that the target channel is aligned (e.g., maximally aligned) with the "reference" channel. The downmix algorithm to determine the mid channel and the side channel may be performed on the reference channel and the non-causal shifted target channel.

The encoder may determine the temporal mismatch value based on the reference audio channel and a plurality of temporal mismatch values applied to the target audio channel. For example, a first frame of the reference audio channel, X, may be received at a first time ($m_1$). A first particular frame of the target audio channel, Y, may be received at a second time ($n_1$) corresponding to a first temporal mismatch value, e.g., $shift1=n_1-m_1$. Further, a second frame of the reference audio channel may be received at a third time ($m_2$). A second particular frame of the target audio channel may be received at a fourth time ($n_2$) corresponding to a second temporal mismatch value, e.g., $shift2=n_2-m_2$.

The device may perform a framing or a buffering algorithm to generate a frame (e.g., 20 ms samples) at a first sampling rate (e.g., 32 kHz sampling rate (i.e., 640 samples per frame)). The encoder may, in response to determining that a first frame of the first audio signal and a second frame of the second audio signal arrive at the same time at the device, estimate a temporal mismatch value (e.g., shift1) as equal to zero samples. A Left channel (e.g., corresponding to the first audio signal) and a Right channel (e.g., corresponding to the second audio signal) may be temporally aligned. In some cases, the Left channel and the Right channel, even when aligned, may differ in energy due to various reasons (e.g., microphone calibration).

In some examples, the Left channel and the Right channel may be temporally misaligned due to various reasons (e.g., a sound source, such as a talker, may be closer to one of the microphones than another and the two microphones may be greater than a threshold (e.g., 1-20 centimeters) distance apart). A location of the sound source relative to the microphones may introduce different delays in the Left channel and the Right channel. In addition, there may be a gain difference, an energy difference, or a level difference between the Left channel and the Right channel.

In some examples, where there are more than two channels, a reference channel is initially selected based on the levels or energies of the channels, and subsequently refined based on the temporal mismatch values between different pairs of the channels, e.g., t1(ref, ch2), t2(ref, ch3), t3(ref, ch4), . . . , where ch1 is the ref channel initially and t1(·), t2(·), etc. are the functions to estimate the mismatch values. If all temporal mismatch values are positive then ch1 is treated as the reference channel. If any of the mismatch values is a negative value, then the reference channel is reconfigured to the channel that was associated with a mismatch value that resulted in a negative value and the above process is continued until the best selection (e.g., based on maximally decorrelating maximum number of side channels) of the reference channel is achieved. A hysteresis may be used to overcome any sudden variations in reference channel selection.

In some examples, a time of arrival of audio signals at the microphones from multiple sound sources (e.g., talkers) may vary when the multiple talkers are alternatively talking (e.g., without overlap). In such a case, the encoder may dynamically adjust a temporal mismatch value based on the talker to identify the reference channel. In some other examples, the multiple talkers may be talking at the same time, which may result in varying temporal mismatch values depending on who is the loudest talker, closest to the microphone, etc. In such a case, identification of reference and target channels may be based on the varying temporal shift values in the current frame and the estimated temporal mismatch values in the previous frames, and based on the energy or temporal evolution of the first and second audio signals. In some examples, the first audio signal and second audio signal may be synthesized or artificially generated when the two signals potentially show less (e.g., no) correlation. It should be understood that the examples described herein are illustrative and may be instructive in determining a relationship between the first audio signal and the second audio signal in similar or different situations.

The encoder may generate comparison values (e.g., difference values or cross-correlation values) based on a comparison of a first frame of the first audio signal and a plurality of frames of the second audio signal. Each frame of the plurality of frames may correspond to a particular temporal mismatch value. The encoder may generate a first estimated temporal mismatch value based on the comparison values. For example, the first estimated temporal mismatch value may correspond to a comparison value indicating a higher temporal-similarity (or lower difference) between the first frame of the first audio signal and a corresponding first frame of the second audio signal.

The encoder may determine a final temporal mismatch value by refining, in multiple stages, a series of estimated temporal mismatch values. For example, the encoder may first estimate a "tentative" temporal mismatch value based on comparison values generated from stereo pre-processed and re-sampled versions of the first audio signal and the second audio signal. The encoder may generate interpolated comparison values associated with temporal mismatch values proximate to the estimated "tentative" temporal mismatch value. The encoder may determine a second estimated "interpolated" temporal mismatch value based on the interpolated comparison values. For example, the second estimated "interpolated" temporal mismatch value may correspond to a particular interpolated comparison value that indicates a higher temporal-similarity (or lower difference) than the remaining interpolated comparison values and the first estimated "tentative" temporal mismatch value. If the second estimated "interpolated" temporal mismatch value of the current frame (e.g., the first frame of the first audio signal) is different than a final temporal mismatch value of a previous frame (e.g., a frame of the first audio signal that precedes the first frame), then the "interpolated" temporal mismatch value of the current frame is further "amended" to improve the temporal-similarity between the first audio signal and the shifted second audio signal. In particular, a third estimated "amended" temporal mismatch value may correspond to a more accurate measure of temporal-similarity by searching around the second estimated "interpolated" temporal mismatch value of the current frame and the final estimated temporal mismatch value of the previous frame. The third estimated "amended" temporal mismatch value is further conditioned to estimate the final temporal mismatch value by limiting any spurious changes in the temporal mismatch value between frames and further controlled to not switch from a negative temporal mismatch value to a positive temporal mismatch value (or vice versa) in two successive (or consecutive) frames as described herein.

In some examples, the encoder may refrain from switching between a positive temporal mismatch value and a negative temporal mismatch value or vice-versa in consecutive frames or in adjacent frames. For example, the encoder may set the final temporal mismatch value to a particular value (e.g., 0) indicating no temporal-shift based on the estimated "interpolated" or "amended" temporal mismatch value of the first frame and a corresponding estimated "interpolated" or "amended" or final temporal mismatch value in a particular frame that precedes the first frame. To illustrate, the encoder may set the final temporal mismatch value of the current frame (e.g., the first frame) to indicate no temporal-shift, i.e., shift1=0, in response to determining that one of the estimated "tentative" or "interpolated" or "amended" temporal mismatch value of the current frame is positive and the other of the estimated "tentative" or "interpolated" or "amended" or "final" estimated temporal mismatch value of the previous frame (e.g., the frame preceding the first frame) is negative. Alternatively, the encoder may also set the final temporal mismatch value of the current frame (e.g., the first frame) to indicate no temporal-shift, i.e., shift1=0, in response to determining that one of the estimated "tentative" or "interpolated" or "amended" temporal mismatch value of the current frame is negative and the other of the estimated "tentative" or "interpolated" or "amended" or "final" estimated temporal mismatch value of the previous frame (e.g., the frame preceding the first frame) is positive.

The encoder may select a frame of the first audio signal or the second audio signal as a "reference" or "target" based on the temporal mismatch value. For example, in response to determining that the final temporal mismatch value is positive, the encoder may generate a reference channel or signal indicator having a first value (e.g., 0) indicating that the first audio signal is a "reference" signal and that the second audio signal is the "target" signal. Alternatively, in response to determining that the final temporal mismatch value is negative, the encoder may generate the reference channel or signal indicator having a second value (e.g., 1) indicating that the second audio signal is the "reference" signal and that the first audio signal is the "target" signal.

The encoder may estimate a relative gain (e.g., a relative gain parameter) associated with the reference signal and the non-causal shifted target signal. For example, in response to determining that the final temporal mismatch value is positive, the encoder may estimate a gain value to normalize or equalize the amplitude or power levels of the first audio signal relative to the second audio signal that is offset by the non-causal temporal mismatch value (e.g., an absolute value of the final temporal mismatch value). Alternatively, in response to determining that the final temporal mismatch value is negative, the encoder may estimate a gain value to normalize or equalize the power or amplitude levels of the non-causal shifted first audio signal relative to the second audio signal. In some examples, the encoder may estimate a gain value to normalize or equalize the amplitude or power levels of the "reference" signal relative to the non-causal shifted "target" signal. In other examples, the encoder may estimate the gain value (e.g., a relative gain value) based on the reference signal relative to the target signal (e.g., the unshifted target signal).

The encoder may generate at least one encoded signal (e.g., a mid signal, a side signal, or both) based on the reference signal, the target signal, the non-causal temporal mismatch value, and the relative gain parameter. In other implementations, the encoder may generate at least one encoded signal (e.g., a mid channel, a side channel, or both) based on the reference channel and the temporal-mismatch adjusted target channel. The side signal may correspond to a difference between first samples of the first frame of the first audio signal and selected samples of a selected frame of the second audio signal. The encoder may select the selected frame based on the final temporal mismatch value. Fewer bits may be used to encode the side channel signal because of reduced difference between the first samples and the selected samples as compared to other samples of the second audio signal that correspond to a frame of the second audio signal that is received by the device at the same time as the first frame. A transmitter of the device may transmit the at least one encoded signal, the non-causal temporal mismatch value, the relative gain parameter, the reference channel or signal indicator, or a combination thereof.

The encoder may generate at least one encoded signal (e.g., a mid signal, a side signal, or both) based on the reference signal, the target signal, the non-causal temporal mismatch value, the relative gain parameter, low band parameters of a particular frame of the first audio signal, high band parameters of the particular frame, or a combination thereof. The particular frame may precede the first frame. Certain low band parameters, high band parameters, or a combination thereof, from one or more preceding frames may be used to encode a mid signal, a side signal, or both, of the first frame. Encoding the mid signal, the side signal, or both, based on the low band parameters, the high band parameters, or a combination thereof, may improve estimates of the non-causal temporal mismatch value and inter-channel relative gain parameter. The low band parameters, the high band parameters, or a combination thereof, may include a pitch parameter, a voicing parameter, a coder type parameter, a low-band energy parameter, a high-band energy parameter, a tilt parameter, a pitch gain parameter, a FCB gain parameter, a coding mode parameter, a voice activity parameter, a noise estimate parameter, a signal-to-noise ratio parameter, a formants parameter, a speech/music decision parameter, the non-causal shift, the inter-channel gain parameter, or a combination thereof. A transmitter of the device may transmit the at least one encoded signal, the non-causal temporal mismatch value, the relative gain parameter, the reference channel (or signal) indicator, or a combination thereof. In the present disclosure, terms such as "determining", "calculating", "shifting", "adjusting", etc. may be used to describe how one or more operations are performed. It should be noted that such terms are not to be construed as limiting and other techniques may be utilized to perform similar operations.

According to some implementations, the final temporal mismatch value (e.g., a shift value) is an "unquantized" value indicating the "true" shift between a target channel and a reference channel. Although all digital values are "quantized" due to the precision provided by the system storing or using the digital value, as used herein, digital values are "quantized" if generated by a quantization operation to reduce a precision of the digital value (e.g., to reduce a range or bandwidth associated with the digital value) and are "unquantized" otherwise. As a non-limiting example, the first audio signal may be the target channel, and the second audio signal may be the reference channel. If the true shift between the target and reference channel is thirty-seven samples, the target channel may be shifted by thirty-seven samples at the encoder to generate a shifted target channel that is temporally aligned with the reference channel. In other implementations, both the channels may be shifted such that the relative shift between the channels is equal to the final shift value (37 samples in this example). This relative shifting of channels by the shift value achieves the effect of temporally aligning the channels. A high-efficiency encoder may align the channels as much as possible to reduce coding entropy, and thus increase coding efficiency, because coding entropy is sensitive to shift changes between the channels. The shifted target channel and the reference channel may be used to generate a mid channel that is encoded and transmitted to a decoder as part of a bitstream. Additionally, the final temporal mismatch value may be quantized and transmitted to the decoder as part of the bitstream. For example, the final temporal mismatch value may be quantized using a "floor" of four, such that the quantized final temporal mismatch value is equal to nine (e.g., approximately 37/4).

The decoder may decode the mid channel to generate a decoded mid channel, and the decoder may generate a first channel and a second channel based on the decoded mid channel. For example, the decoder may upmix the decoded mid channel using stereo parameters included in the bitstream to generate the first channel and the second channel. The first and second channels may be temporally aligned at the decoder; however, the decoder may shift one or more of the channels relative to each other based on the quantized final temporal mismatch value. For example, if the first channel corresponds to the target channel (e.g., the first audio signal) at the encoder, the decoder may shift the first channel by thirty-six samples (e.g., 4*9) to generate a shifted first channel. Perceptually, the shifted first channel and the second channel are similar to the target channel and the reference channel, respectively. For example, if the thirty-seven sample shift between the target and reference channel at the encoder corresponds to a 10 ms shift, the thirty-six sample shift between the shifted first channel and the second channel at the decoder is perceptually similar to, and may be perceptually indistinguishable from, the thirty-seven sample shift.

Referring to FIG. 1, a particular illustrative example of a system 100 is shown. The system 100 includes a first device 104 communicatively coupled, via a network 120, to a second device 106. The network 120 may include one or more wireless networks, one or more wired networks, or a combination thereof.

The first device 104 includes an encoder 114, a transmitter 110, and one or more input interfaces 112. A first input interface of the input interfaces 112 may be coupled to a first microphone 146. A second input interface of the input interface(s) 112 may be coupled to a second microphone 148. The first device 104 may also include a memory 153 configured to store analysis data, as described below. The second device 106 may include a decoder 118 and a memory 154. The second device 106 may be coupled to a first loudspeaker 142, a second loudspeaker 144, or both.

During operation, the first device 104 may receive a first audio signal 130 via the first input interface from the first microphone 146 and may receive a second audio signal 132 via the second input interface from the second microphone 148. The first audio signal 130 may correspond to one of a right channel signal or a left channel signal. The second audio signal 132 may correspond to the other of the right channel signal or the left channel signal. As described herein, the first audio signal 130 may correspond to a reference channel, and the second audio signal 132 may correspond to a target channel. However, it should be understood that in other implementations, the first audio signal 130 may correspond to the target channel, and the second audio signal 132 may correspond to the reference channel. In other implementations, there may be no assignment of reference and target channel altogether. In such cases, the channel alignment at the encoder and the channel de-alignment at the decoder may be performed on either or both of the channels such that the relative shift between the channels is based on a shift value.

The first microphone 146 and the second microphone 148 may receive audio from a sound source 152 (e.g., a user, a speaker, ambient noise, a musical instrument, etc.). In a particular aspect, the first microphone 146, the second microphone 148, or both, may receive audio from multiple sound sources. The multiple sound sources may include a dominant (or most dominant) sound source (e.g., the sound source 152) and one or more secondary sound sources. The one or more secondary sound sources may correspond to traffic, background music, another talker, street noise, etc. The sound source 152 (e.g., the dominant sound source) may be closer to the first microphone 146 than to the second microphone 148. Accordingly, an audio signal from the sound source 152 may be received at the input interface(s) 112 via the first microphone 146 at an earlier time than via the second microphone 148. This natural delay in the multi-channel signal acquisition through the multiple microphones may introduce a temporal shift between the first audio signal 130 and the second audio signal 132.

The first device 104 may store the first audio signal 130, the second audio signal 132, or both, in the memory 153. The encoder 114 may determine a first shift value 180 (e.g., a non-causal shift value) indicative of the shift (e.g., a non-causal shift) of the first audio signal 130 relative to the second audio signal 132 for a first frame 190. The first shift value 180 may be a value (e.g., an unquantized value) representing a shift between the reference channel (e.g., the first audio signal 130) and the target channel (e.g., the second audio signal 132) for the first frame 190. The first shift value 180 may be stored in the memory 153 as analysis data. The encoder 114 may also determine a second shift value 184 indicative of the shift of the first audio signal 130 relative to the second audio signal 132 for a second frame 192. The second frame 192 may follow (e.g., be later in time than) the first frame 190. The second shift value 184 may be a value (e.g., an unquantized value) representing a shift between the reference channel (e.g., the first audio signal 130) and the target channel (e.g., the second audio signal 132) for the second frame 192. The second shift value 184 may also be stored in the memory 153 as analysis data.

Thus, the shift values 180, 184 (e.g., the mismatch values) may be indicative of an amount of temporal mismatch (e.g., time delay) between the first audio signal 130 and the second audio signal 132 for the first and second frames 190, 192, respectively. As referred to herein, "time delay" may correspond to "temporal delay." The temporal mismatch may be indicative of a time delay between receipt, via the first microphone 146, of the first audio signal 130 and receipt, via the second microphone 148, of the second audio signal 132. For example, a first value (e.g., a positive value) of the shift values 180, 184 may indicate that the second audio signal 132 is delayed relative to the first audio signal 130. In this example, the first audio signal 130 may correspond to a leading signal and the second audio signal 132 may correspond to a lagging signal. A second value (e.g., a negative value) of the shift values 180, 184 may indicate that the first audio signal 130 is delayed relative to the second audio signal 132. In this example, the first audio signal 130 may correspond to a lagging signal and the second audio signal 132 may correspond to a leading signal. A third value (e.g., 0) of the shift values 180, 184 may indicate no delay between the first audio signal 130 and the second audio signal 132.

The encoder 114 may quantize the first shift value 180 to generate a first quantized shift value 181. To illustrate, if the first shift value 180 (e.g., the true shift value) is equal to thirty-seven samples, the encoder 114 may quantize the first shift value 180 based on a floor to generate the first quantized shift value 181. As a non-limiting example, if the floor is equal to four, the first quantized shift value 181 may be equal to nine (e.g., approximately 37/4). As described below, the first shift value 180 may be used to generate a first portion of a mid channel 191, and the first quantized shift value 181 may be encoded into a bitstream 160 and transmitted to the second device 106. As used herein, a "portion" of a signal or channel includes one or more frames of the signal or channel, one or more sub-frames of the signal or channel, one or more samples, bits, chunks, words, or other segments of the signal or channel, or any combination thereof. In a similar manner, the encoder 114 may quantize the second shift value 184 to generate a second quantized shift value 185. To illustrate, if the second shift value 184 is equal to thirty-six samples, the encoder 114 may quantize the second shift value 184 based on the floor to generate the second quantized shift value 185. As a non-limiting example, the second quantized shift value 185 may also be equal to nine (e.g., 36/4). As described below, the second shift value 184 may be used to generate a second portion of the mid channel 193, and the second quantized shift value 185 may be encoded into the bitstream 160 and transmitted to the second device 106.

The encoder 114 may also generate a reference signal indicator based on the shift values 180, 184. For example, the encoder 114 may, in response to determining that the first shift value 180 indicates a first value (e.g., a positive value), generate the reference signal indicator to have a first value (e.g., 0) indicating that the first audio signal 130 is a "reference" signal and that the second audio signal 132 corresponds to a "target" signal.

The encoder 114 may temporally align the first audio signal 130 and the second audio signal 132 based on the shift values 180, 184. For example, for the first frame 190, the encoder 114 may temporally shift the second audio signal 132 by the first shift value 180 to generate a shifted second audio signal that is temporally aligned with the first audio signal 130. Although the second audio signal 132 is described as undergoing a temporal shift in the time domain, it should be understood that the second audio signal 132 may undergo a phase shift in the frequency domain to generate the shifted second audio signal 132. For example, the first shift value 180 may correspond to a frequency-domain shift value. For the second frame 192, the encoder 114 may temporally shift the second audio signal 132 by the second shift value 184 to generate a shifted second audio signal that is temporally aligned with the first audio signal 130. Although the second audio signal 132 is described as undergoing a temporal shift in the time domain, it should be understood that the second audio signal 132 may undergo a phase shift in the frequency domain to generate the shifted second audio signal 132. For example, the second shift value 184 may correspond to a frequency-domain shift value.

The encoder 114 may generate one or more additional stereo parameters (e.g., other stereo parameters besides the shift values 180, 184) for each frame based on the samples of the reference channel and samples of the target channel. As a non-limiting example, the encoder 114 may generate a first stereo parameter 182 for the first frame 190 and a second stereo parameter 186 for the second frame 192. Non-limiting examples of the stereo parameters 182, 186 may include other shift values, inter-channel phase difference parameters, inter-channel level difference parameters, inter-channel time difference parameters, inter-channel correlation parameters, spectral tilt parameters, inter-channel gain parameters, inter-channel voicing parameters, or inter-channel pitch parameters.

To illustrate, if the stereo parameters 182, 186 correspond to a gain parameters, for each frame, the encoder 114 may generate a gain parameter (e.g., a codec gain parameter) based on samples of the reference signal (e.g., the first audio signal 130) and based on samples of the target signal (e.g., the second audio signal 132). For example, for the first frame 190, the encoder 114 may select samples of the second audio signal 132 based on the first shift value 180 (e.g., the non-causal shift value). As referred to herein, selecting samples of an audio signal based on a shift value may correspond to generating a modified (e.g., time-shifted or frequency-shifted) audio signal by adjusting (e.g., shifting) the audio signal based on the shift value and selecting samples of the modified audio signal. For example, the encoder 114 may generate a time-shifted second audio signal by shifting the second audio signal 132 based on the first shift value 180 and may select samples of the time-shifted second audio signal. The encoder 114 may, in response to determining that the first audio signal 130 is the reference signal, determine the gain parameter of the selected samples based on the first samples of the first frame 190 of the first audio signal 130. As an example, the gain parameter may be based on one of the following Equations:

$$g_D = \frac{\sum_{n=0}^{N-N1} Ref(n)Targ(n+N_1)}{\sum_{n=0}^{N-N1} Targ^2(n+N_1)}, \quad \text{Equation 1a}$$

$$g_D = \frac{\sum_{n=0}^{N-N1} |Ref(n)|}{\sum_{n=0}^{N-N1} |Targ(n+N_1)|}, \quad \text{Equation 1b}$$

$$g_D = \frac{\sum_{n=0}^{N} Ref(n)Targ(n)}{\sum_{n=0}^{N} Targ^2(n)}, \quad \text{Equation 1c}$$

$$g_D = \frac{\sum_{n=0}^{N} |Ref(n)|}{\sum_{n=0}^{N} |Targ(n)|}, \quad \text{Equation 1d}$$

$$g_D = \frac{\sum_{n=0}^{N-N1} Ref(n)Targ(n)}{\sum_{n=0}^{N} Ref^2(n)}, \quad \text{Equation 1e}$$

$$g_D = \frac{\sum_{n=0}^{N-N1} |Targ(n)|}{\sum_{n=0}^{N} |Ref(n)|}, \quad \text{Equation 1f}$$

where $g_D$ corresponds to the relative gain parameter for downmix processing, Ref (n) corresponds to samples of the "reference" signal, $N_1$ corresponds to the first shift value 180 of the first frame 190, and Targ $(n+N_1)$ corresponds to samples of the "target" signal. The gain parameter ($g_D$) may be modified, e.g., based on one of the Equations 1a-1f, to incorporate long term smoothing/hysteresis logic to avoid large jumps in gain between frames.

The encoder 114 may quantize the stereo parameters 182, 186 to generate quantized stereo parameters 183, 187 that are encoded into the bitstream 160 and transmitted to the second device 106. For example, the encoder 114 may quantize the first stereo parameter 182 to generate a first quantized stereo parameter 183, and the encoder 114 may quantize the second stereo parameter 186 to generate a second quantized stereo parameter 187. The quantized stereo parameters 183, 187 may have a lower resolution (e.g., less precision) than the stereo parameters 182, 186, respectively.

For each frame 190, 192, the encoder 114 may generate one or more encoded signals based on the shift values 180, 184, the other stereo parameters 182, 186, and the audio signals 130, 132. For example, for the first frame 190, the encoder 114 may generate a first portion of a mid channel 191 based on the first shift value 180 (e.g., the unquantized shift value), the first stereo parameter 182, and the audio signals 130, 132. Additionally, for the second frame 192, the encoder 114 may generate a second portion of the mid channel 193 based on the second shift value 184 (e.g., the unquantized shift value), the second stereo parameter 186, and the audio signals 130, 132. According to some implementations, the encoder 114 may generate side channels (not shown) for each frame 190, 192 based on the shift values 180, 184, the other stereo parameters 182, 186, and the audio signals 130, 132.

For example, the encoder 114 may generate the portions of the mid channel 191, 193 based on one of the following Equations:

$$M=\mathrm{Ref}(n)+g_D T\arg(n+N_1), \quad \text{Equation 2a}$$

$$M=\mathrm{Ref}(n)+T\arg(n+N_1), \quad \text{Equation 2b}$$

$$M=\mathrm{Ref}(n-N_2)+T\arg(n+N_1-N_2), \text{ where } N_2 \text{ can take any arbitrary value}, \quad \text{Equation 2c}$$

where M corresponds to the mid channel, g D corresponds to the relative gain parameter (e.g., the stereo parameters 182, 186) for downmix processing, Ref (n) corresponds to samples of the "reference" signal, N 1 corresponds to the shift values 180, 184, and Targ(n+N 1) corresponds to samples of the "target" signal.

The encoder 114 may generate the side channels based on one of the following Equations:

$$S=\mathrm{Ref}(n)-g\ D\ T\arg(n+N_1), \quad \text{Equation 3a}$$

$$S=g_D\ \mathrm{Ref}(n)-T\arg(n+N_1), \quad \text{Equation 3b}$$

$$S=\mathrm{Ref}(n-N_2)-g_D T\arg(n+N_1-N_2), \text{ where } N_2 \text{ can take any arbitrary value}, \quad \text{Equation 3c}$$

where S corresponds to the side channel signal, g D corresponds to the relative gain parameter (e.g., the stereo parameters 182, 186) for downmix processing, Ref (n) corresponds to samples of the "reference" signal, N 1 corresponds to the shift values 180, 184, and Targ(n+N 1) corresponds to samples of the "target" signal.

The transmitter 110 may transmit the bitstream 160, via the network 120, to the second device 106. The first frame 190 and the second frame 192 may be encoded into the bitstream 160. For example, the first portion of the mid channel 191, the first quantized shift value 181, and the first quantized stereo parameter 183 may be encoded into the bitstream 160. Additionally, the second portion of the mid channel 193, the second quantized shift value 185, and the second quantized stereo parameter 187 may be encoded into the bitstream 160. Side channel information may also be encoded in the bitstream 160. Although not shown, additional information may also be encoded into the bitstream 160 for each frame 190, 192. As a non-limiting example, a reference channel indicator may be encoded into the bitstream 160 for each frame 190, 192.

Due to poor transmission conditions, some data encoded into the bitstream 160 may be lost in transmission. Packet loss may occur due to poor transmission conditions, frame erasure may occur due to poor radio conditions, packets may arrive late due to high jitter, etc. According to the non-limiting illustrative example, the second device 106 may receive the first frame 190 of the bitstream 160 and the second portion of the mid channel 193 of the second frame 192. Thus, the second quantized shift value 185 and the second quantized stereo parameter 187 may be lost in transmission due to poor transmission conditions.

The second device 106 may therefore receive at least a portion of the bitstream 160 as transmitted by the first device 102. The second device 106 may store the received portion of the bitstream 160 in the memory 154 (e.g., in a buffer). For example, the first frame 190 may be stored in the memory 154 and the second portion of the mid channel 193 of the second frame 192 may also be stored in the memory 154.

The decoder 118 may decode the first frame 190 to generate a first output signal 126 that corresponds to the first audio signal 130 and to generate a second output signal 128 that corresponds to the second audio signal 132. For example, the decoder 118 may decode the first portion of the mid channel 191 to generate a first portion of a decoded mid channel 170. The decoder 118 may also perform a transform operation on the first portion of the decoded mid channel 170 to generate a first portion of a frequency-domain (FD) decoded mid channel 171. The decoder 118 may upmix the first portion of the frequency-domain decoded mid channel 171 to generate a first frequency-domain channel (not shown) associated with the first output signal 126 and a second frequency-domain channel (not shown) associated with the second output signal 128. During the upmix, the decoder 118 may apply the first quantized stereo parameter 183 to the first portion of the frequency-domain decoded mid channel 171.

It should be noted that in other implementations, the decoder 118 may not perform the transform operation, but rather perform the upmix based on the mid channel, some stereo parameters (e.g., the downmix gain) and additionally, if available, also based on a decoded side channel in the time domain to generate the first time-domain channel (not shown) associated with the first output channel 126 and a second time-domain channel (not shown) associated with the second output channel 128.

If the first quantized shift value 181 corresponds to a frequency-domain shift value, the decoder 118 may shift the second frequency-domain channel by the first quantized shift value 181 to generate a second shifted frequency-domain channel (not shown). The decoder 118 may perform an inverse transform operation on the first frequency-domain channel to generate the first output signal 126. The decoder 118 may also perform an inverse transform operation on the second shifted frequency-domain channel to generate the second output signal 128.

If the first quantized shift value 181 corresponds to a time-domain shift value, the decoder 118 may perform an inverse transform operation on first frequency-domain channel to generate the first output signal 126. The decoder 118 may also perform an inverse transform operation on the second frequency-domain channel to generate a second time-domain channel. The decoder 118 may shift the second time-domain channel by the first quantized shift value 181 to generate the second output signal 128. Thus, the decoder 118 may use the first quantized shift value 181 to emulate a perceptible difference between the first output signal 126 and the second output signal 128. The first loudspeaker 142 may output the first output signal 126, and the second loudspeaker 144 may output the second output signal 128. In some cases, the inverse transform operation may be omitted in implementations where the upmix was performed in time domain to directly generate the first time-domain channel and the second time-domain channel, as described above. It should be also noted that the presence of time-domain shift value at the decoder 118 may simply be a matter of indicating that the decoder is configured to perform time-domain shifting and in some implementations, although a time-domain shift may be available at the decoder 118 (indicating the decoder performs the shift operation in time domain), the encoder from which the bitstream was received may have performed either a frequency domain shift operation or a time-domain shift operation for aligning the channels.

If the decoder 118 determines that the second frame 192 is unavailable for decoding operations (e.g., determines that the second quantized shift value 185 and the second quantized stereo parameter 187 are unavailable), the decoder 118 may generate the output signals 126, 128 for the second frame 192 based on the stereo parameters associated with the first frame 190. For example, the decoder 118 may estimate or interpolate the second quantized shift value 185 based on the first quantized shift value 181. Additionally, the decoder 118 may estimate or interpolate the second quantized stereo parameter 187 based on the first quantized stereo parameter 183.

After estimating the second quantized shift value 185 and the second quantized stereo parameter 187, the decoder 118 may generate the output signals 126, 128 for the second frame 192 in a similar manner as the output signals 126, 128 are generated for the first frame 190. For example, the decoder 118 may decode the second portion of the mid channel 193 to generate a second portion of the decoded mid channel 172. The decoder 118 may also perform a transform operation on the second portion of the decoded mid channel 172 to generate a second frequency-domain decoded mid channel 173. Based on the estimated quantized shift value and the estimated quantized stereo parameter 187, the decoder 118 may upmix the second frequency-domain decoded mid channel 173, perform an inverse transform on the upmixed signals, and shift the resulting signal to generate the output signals 126, 128. An example of decoding operations are described in greater detail with respect to FIG. 2.

The system 100 may align the channels as much as possible at the encoder 114 to reduce coding entropy, and thus increase coding efficiency, because coding entropy is sensitive to shift changes between the channels. For example, the encoder 114 may use unquantized shift values to accurately align the channels because unquantized shift values have a relatively high resolution. At the decoder 118, quantized stereo parameters may be used to emulate a perceptible difference between the output signals 126, 128 using a reduced number of bits as compared to using unquantized shift values, and missing stereo parameters (due to poor transmission) may be interpolated or estimated using stereo parameters of one or more previous frames. According to some implementations, the shift values 180, 184 (e.g., the unquantized shift values) may be used to shift the target channels in the frequency domain, and quantized shift values 181, 185 may be used to shift the target channels in the time domain. For example, the shift values used for time-domain stereo encoding may have a lower resolution than the shift values used for frequency-domain stereo encoding.

Figure 2:
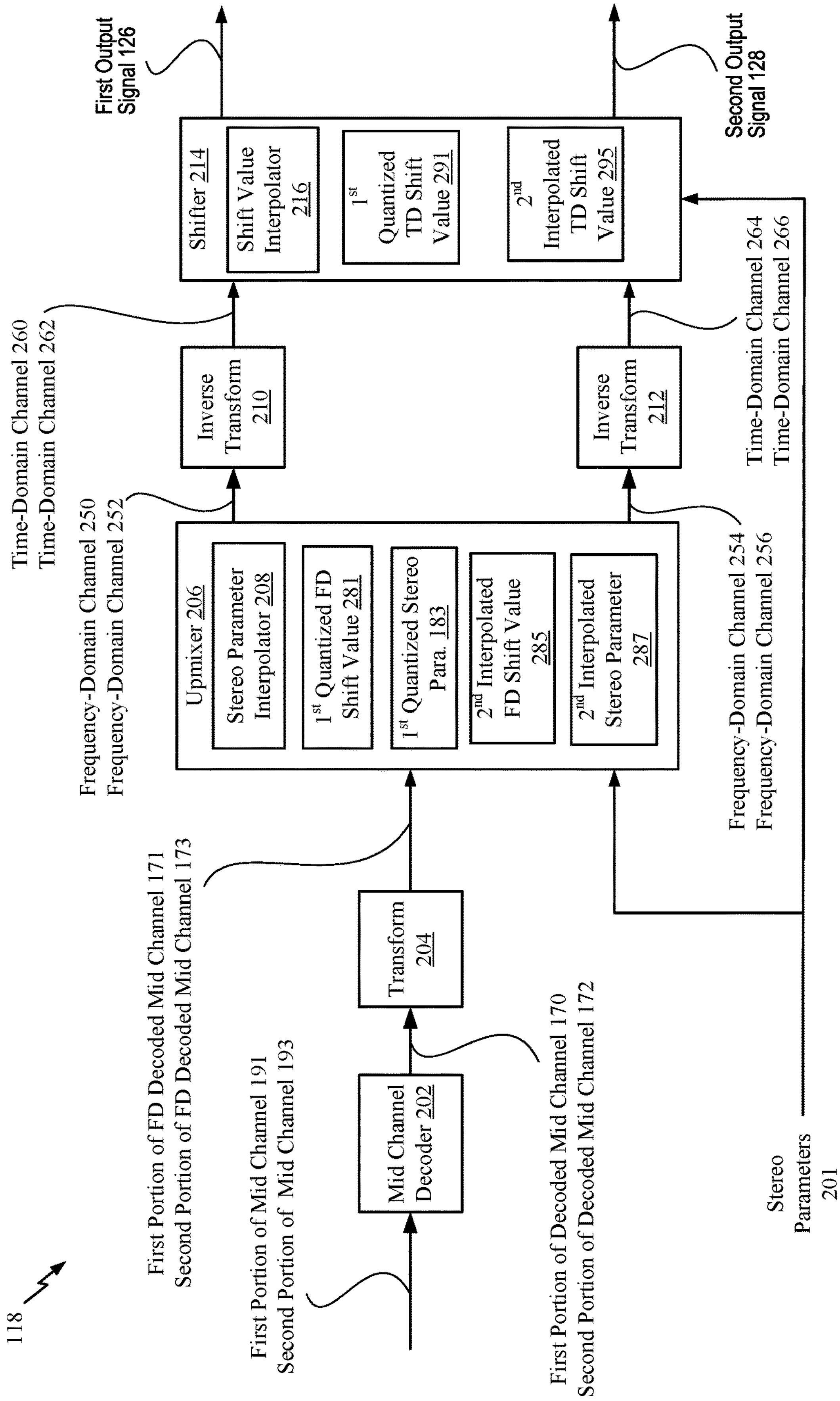
FIG. 2 is a diagram illustrating the decoder of FIG. 1.

Referring to FIG. 2, a diagram illustrating a particular implementation of the decoder 118 is shown. The decoder 118 includes a mid channel decoder 202, a transform unit 204, an upmixer 206, an inverse transform unit 210, an inverse transform unit 212, and a shifter 214.

The bitstream 160 of FIG. 1 may be provided to the decoder 118. For example, the first portion of the mid channel 191 of the first frame 190 and the second portion of the mid channel 193 of the second frame 192 may be provided to the mid channel decoder 202. Additionally, stereo parameters 201 may be provided to the upmixer 206 and to the shifter 214. The stereo parameters 201 may include the first quantized shift value 181 associated with the first frame 190 and the first quantized stereo parameter 183 associated with the first frame 190. As described above with respect to FIG. 1, the second quantized shift value 185 associated with the second frame 192 and the second quantized stereo parameter 187 associated with the second frame 192 may not be received by the decoder 118 due poor transmission conditions.

To decode the first frame 190, the mid channel decoder 202 may decode the first portion of the mid channel 191 to generate the first portion of the decoded mid channel 170 (e.g., a time-domain mid channel). According to some implementations, two asymmetric windows may be applied to the first portion of the decoded mid channel 170 to generate a windowed portion of a time-domain mid channel. The first portion of the decoded mid channel 170 is provided to the transform unit 204. The transform unit 204 may be configured to perform a transform operation on the first portion of the decoded mid channel 170 to generate the first portion of the frequency-domain decoded mid channel 171. The first portion of the frequency-domain decoded mid channel 171 is provided to the upmixer 206. According to some implementations, the windowing and the transform operation may be skipped altogether and the first portion of the decoded mid channel 170 (e.g., a time-domain mid channel) may be directly provided to the upmixer 206.

The upmixer 206 may upmix the first portion of the frequency-domain decoded mid channel 171 to generate a portion of a frequency-domain channel 250 and a portion of a frequency-domain channel 254. The upmixer 206 may apply the first quantized stereo parameter 183 to the first portion of the frequency-domain decoded mid channel 171 during upmix operations to generate the portions of frequency-domain channels 250, 254. According to an implementation where the first quantized shift value 181 includes a frequency-domain shift (e.g., the first quantized shift value 181 corresponds to a first quantized frequency-domain shift value 281), the upmixer 206 may perform a frequency-domain shift (e.g., a phase shift) based on the first quantized frequency-domain shift value 281 to generate the portion of the frequency-domain channel 254. The portion of the frequency-domain channel 250 is provided to the inverse transform unit 210, and the portion of the frequency-domain channel 254 is provided to the inverse transform unit 212. According to some implementations, the upmixer 206 may be configured to operate on time-domain channels where the stereo parameters (e.g., based on target gain values) may be applied in the time domain.

The inverse transform unit 210 may perform an inverse transform operation on the portion of the frequency-domain channel 250 to generate a portion of a time-domain channel 260. The portion of the time-domain channel 260 is provided to the shifter 214. The inverse transform unit 212 may perform an inverse transform operation on the portion of the frequency-domain channel 254 to generate a portion of a time-domain channel 264. The portion of the time-domain channel 264 is also provided to the shifter 214. In implementations where the upmix operation is performed in the time-domain, the inverse transform operations after the upmix operation may be skipped.

According to the implementation where the first quantized shift value 181 corresponds to a first quantized frequency-domain shift value 281, the shifter 214 may bypass shifting operations and pass the portions of the time-domain channels 260, 264 as portions of the output signals 126, 128, respectively. According to an implementation where the first quantized shift value 181 includes a time-domain shift (e.g., the first quantized shift value 181 corresponds to a first quantized time-domain shift value 291), the shifter 214 may shift the portion of the time-domain channel 264 by the first quantized time-domain shift value 291 to generate the portion of the second output signal 128.

Thus, the decoder 118 may use quantized shift values having reduced precision (as compared to the unquantized shift values used at the encoder 114) to generate the portions of the output signals 126, 128 for the first frame 190. Using the quantized shift values to shift the output signal 128 relative to the output signal 126 may restore user perception of the shift at the encoder 114.

To decode the second frame 192, the mid channel decoder 202 may decode the second portion of the mid channel 193 to generate the second portion of the decoded mid channel 172 (e.g., a time-domain mid channel). According to some implementations, two asymmetric windows may be applied to the second portion of the decoded mid channel 172 to generate a windowed portion of the time-domain mid channel. The second portion of the decoded mid channel 172 is provided to the transform unit 204. The transform unit 204 may be configured to perform a transform operation on the second portion of the decoded mid channel 172 to generate the second portion of the frequency-domain decoded mid channel 173. The second portion of the frequency-domain decoded mid channel 173 is provided to the upmixer 206. According to some implementations, the windowing and the transform operation may be skipped altogether and the second portion of the decoded mid channel 172 (e.g., a time-domain mid channel) may be directly provided to the upmixer 206.

As described above with respect to FIG. 1, the second quantized shift value 185 and the second quantized stereo parameter 187 may not be received by the decoder 118 due to poor transmission conditions. As a result, stereo parameters for the second frame 192 may not be accessible to the upmixer 206 and to the shifter 214. The upmixer 206 includes a stereo parameter interpolator 208 that is configured to interpolate (or estimate) the second quantized shift value 185 based on the first quantized frequency-domain shift value 281. For example, the stereo parameter interpolator 208 may generate a second interpolated frequency-domain shift value 285 based on the first quantized frequency-domain shift value 281. The stereo parameter interpolator 208 may also be configured to interpolate (or estimate) the second quantized stereo parameter 187 based on the first quantized stereo parameter 183. For example, the stereo parameter interpolator 208 may generate a second interpolated stereo parameter 287 based on the first quantized stereo parameter 183.

The upmixer 206 may upmix the second portion of the frequency-domain decoded mid channel 173 to generate a portion of a frequency-domain channel 252 and a portion of a frequency-domain channel 256. The upmixer 206 may apply the second interpolated stereo parameter 287 to the second portion of the frequency-domain decoded mid channel 173 during upmix operations to generate the portions of the frequency-domain channels 252, 256. According to an implementation where the first quantized shift value 181 includes a frequency-domain shift (e.g., the first quantized shift value 181 corresponds to a first quantized frequency-domain shift value 281), the upmixer 206 may perform a frequency-domain shift (e.g., a phase shift) based on the second interpolated frequency-domain shift value 285 to generate the portion of the frequency-domain channel 256. The portion of the frequency-domain channel 252 is provided to the inverse transform unit 210, and the portion of the frequency-domain channel 256 is provided to the inverse transform unit 212.

The inverse transform unit 210 may perform an inverse transform operation on the portion of the frequency-domain channel 252 to generate a portion of a time-domain channel 262. The portion of the time-domain channel 262 is provided to the shifter 214. The inverse transform unit 212 may perform an inverse transform operation on the portion of the frequency-domain channel 256 to generate a portion of a time-domain channel 266. The portion of the time-domain channel 266 is also provided to the shifter 214. In implementations where the upmixer 206 operates on time-domain channels, the output of the upmixer 206 may be provided to the shifter 214, and the inverse transform units 210, 212 may be skipped or omitted.

The shifter 214 includes a shift value interpolator 216 that is configured to interpolate (or estimate) the second quantized shift value 185 based on the first quantized time-domain shift value 291. For example, the shift value interpolator 216 may generate a second interpolated time-domain shift value 295 based on the first quantized time-domain shift value 291. According to the implementation where the first quantized shift value 181 corresponds to the first quantized frequency-domain shift value 281, the shifter 214 may bypass shifting operations and pass the portions of the time-domain channels 262, 266 as the output signals 126, 128, respectively. According to the implementation where the first quantized shift value 181 corresponds to the first quantized time-domain shift value 291, the shifter 214 may shift the portion of the time-domain channel 266 by the second interpolated time-domain shift value 295 to generate the second output signal 128.

Thus, the decoder 118 may approximate stereo parameters (e.g., shift values) based on stereo parameters or variation in the stereo parameters from preceding frames. For example, the decoder 118 may extrapolate stereo parameters for frames that are lost during transmission (e.g., the second frame 192) from stereo parameters of one or more preceding frames.

Figure 3:
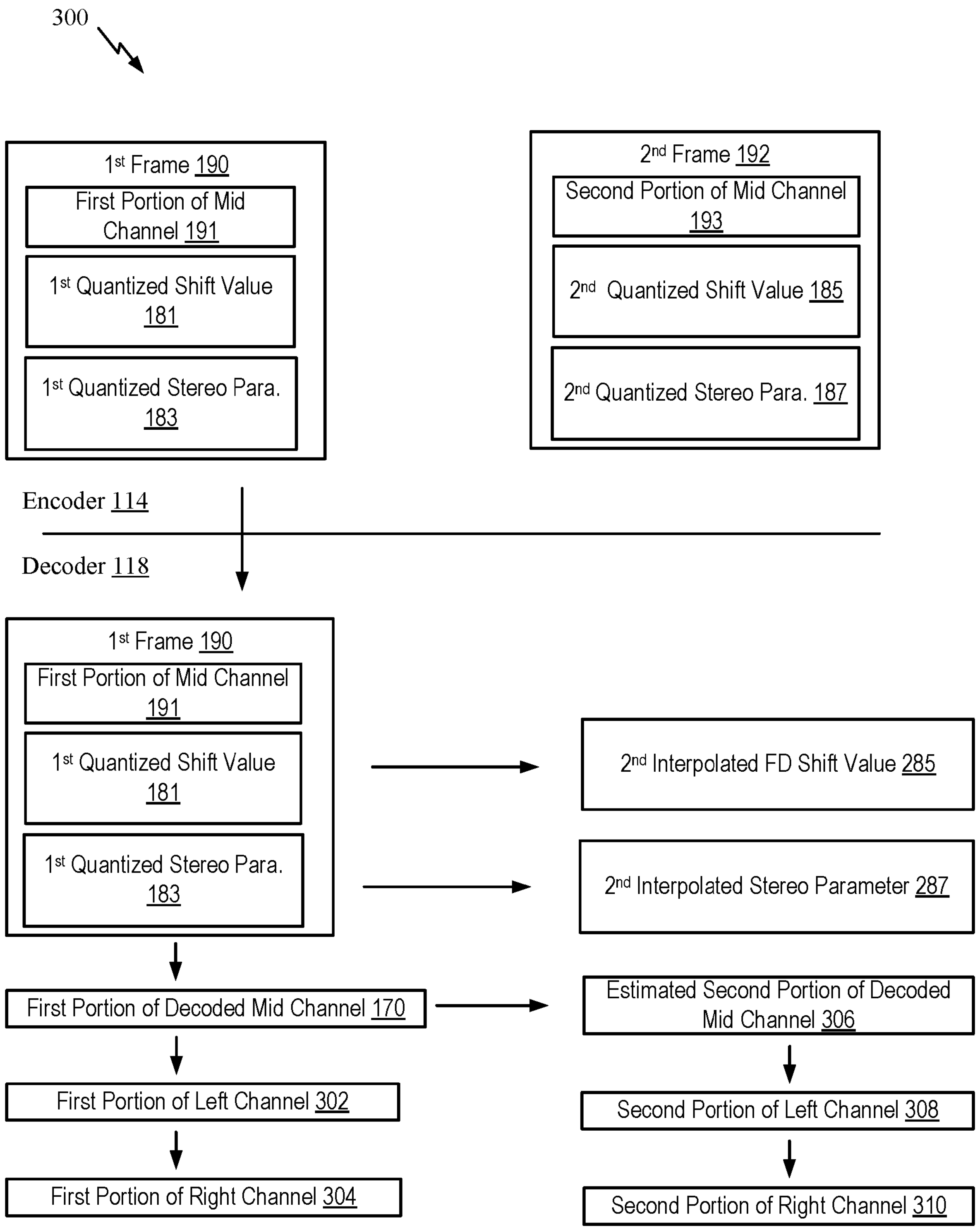
FIG. 3 is a diagram of an illustrative example of predicting stereo parameters for a missing frame at a decoder.

Referring to FIG. 3, a diagram 300 for predicting stereo parameters of a missing frame at a decoder is shown. According to the diagram 300, the first frame 190 may be successfully transmitted from the encoder 114 to the decoder 118, and the second frame 192 may not be successfully transmitted from the encoder 114 to the decoder 118. For example, the second frame 192 may be lost in transmission due to poor transmission conditions.

The decoder 118 may generate the first portion of the decoded mid channel 170 from the first frame 190. For example, the decoder 118 may decode the first portion of the mid channel 191 to generate the first portion of the decoded mid channel 170. Using the techniques described with respect to FIG. 2, the decoder 118 may also generate a first portion of a left channel 302 and a first portion of a right channel 304 based on the first portion of the decoded mid channel 170. The first portion of the left channel 302 may correspond to the first output signal 126, and the first portion of the right channel 304 may correspond to the second output signal 128. For example, the decoder 118 may use the first quantized stereo parameter 183 and the first quantized shift value 181 to generate the channels 302, 304.

The decoder 118 may interpolate (or estimate) the second interpolated frequency-domain shift value 285 (or the second interpolated time-domain shift value 295) based on the first quantized shift value 181. According to other implementations, the second interpolated shift values 285, 295 may be estimated (e.g., interpolated or extrapolated) based on quantized shift values associated with two or more previous frames (e.g., the first frame 190 and at least a frame preceding the first frame or a frame following the second frame 192, one or more other frames in the bitstream 160, or any combination thereof). The decoder 118 may also interpolate (or estimate) the second interpolated stereo parameter 287 based on the first quantized stereo parameter 183. According to other implementations, the second interpolated stereo parameter 287 may be estimated based on quantized stereo parameters associated with two or more other frames (e.g., the first frame 190 and at least a frame preceding or following the first frame).

Additionally, the decoder 118 may interpolate (or estimate) a second portion of the decoded mid channel 306 based on the first portion of the decoded mid channel 170 (or mid channels associated with two or more previous frames). Using the techniques described with respect to FIG. 2, the decoder 118 may also generate a second portion of the left channel 308 and a second portion of the right channel 310 based on the estimated second portion of the decoded mid channel 306. The second portion of the left channel 308 may correspond to the first output signal 126, and the second portion of the right channel 310 may correspond to the second output signal 128. For example, the decoder 118 may use the second interpolated stereo parameter 287 and the second interpolated frequency-domain quantized shift value 285 to generate the left and right channels.

Figure 4A:
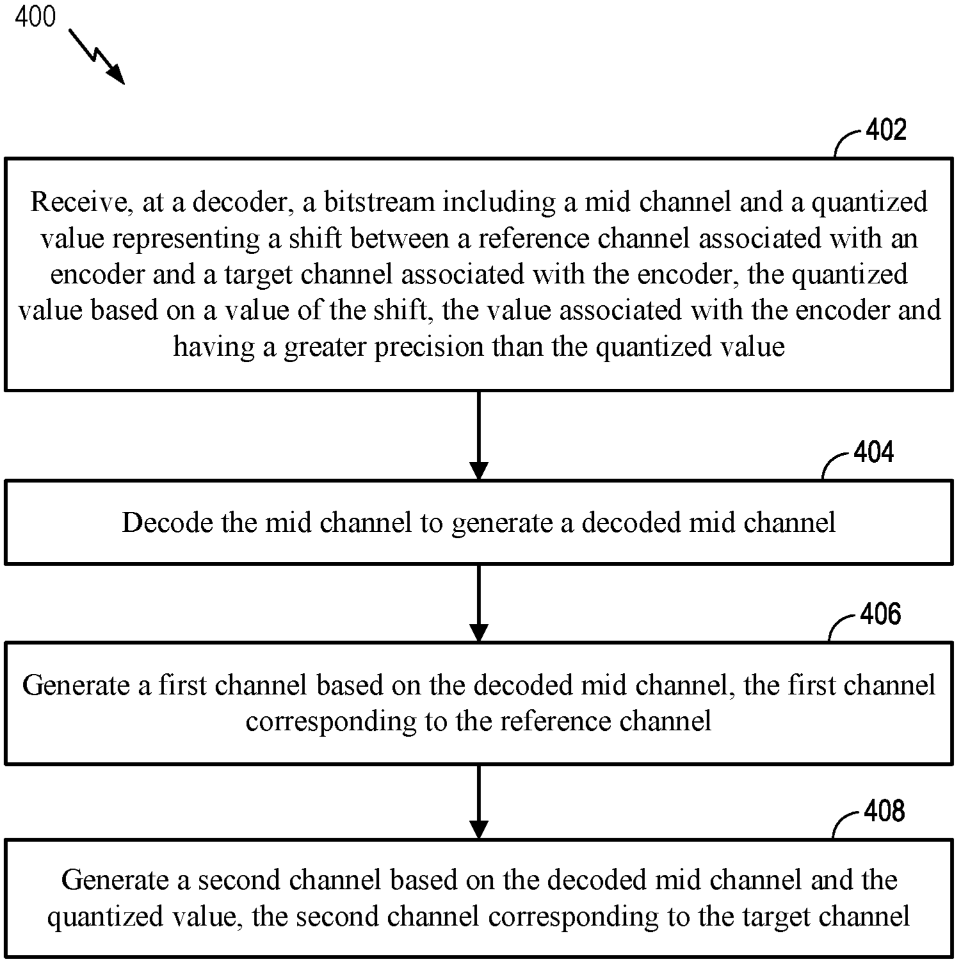
FIG. 4A is a non-limiting illustrative example of a method of decoding an audio signal.

Referring to FIG. 4A, a method 400 of decoding a signal is shown. The method 400 may be performed by the second device 106 of FIG. 1, the decoder 118 of FIGS. 1 and 2, or both.

The method 400 includes receiving, at a decoder, a bitstream including a mid channel and a quantized value representing a shift between a first channel (e.g., a reference channel) associated with an encoder and a second channel (e.g., a target channel) associated with the encoder, at 402. The quantized value is based on a value of the shift. The value is associated with the encoder and has a greater precision than the quantized value.

The method 400 also includes decoding the mid channel to generate a decoded mid channel, at 404. The method 400 further includes generating a first channel (a first generated channel) based on the decoded mid channel, at 406, and generating a second channel (a second generated channel) based on the decoded mid channel and the quantized value, at 408. The first generated channel corresponds to the first channel associated with the encoder (e.g., the reference channel) and the second generated channel corresponds to the second channel associated with the encoder (e.g., the target channel). In some implementations, both the first channel and the second channel may be based on the quantized value of shift. In some implementations, the decoder may not explicitly identify reference and target channels prior to the shifting operation.

Thus, the method 400 of FIG. 4A may enable alignment of encoder-side channels to reduce coding entropy, and thus increase coding efficiency, because coding entropy is sensitive to shift changes between the channels. For example, the encoder 114 may use unquantized shift values to accurately align the channels because unquantized shift values have a relatively high resolution. Quantized shift values may be transmitted to the decoder 118 to reduce data transmission resource usage. At the decoder 118, the quantized shift parameters may be used to emulate a perceptible difference between the output signals 126, 128.

Figure 4B:
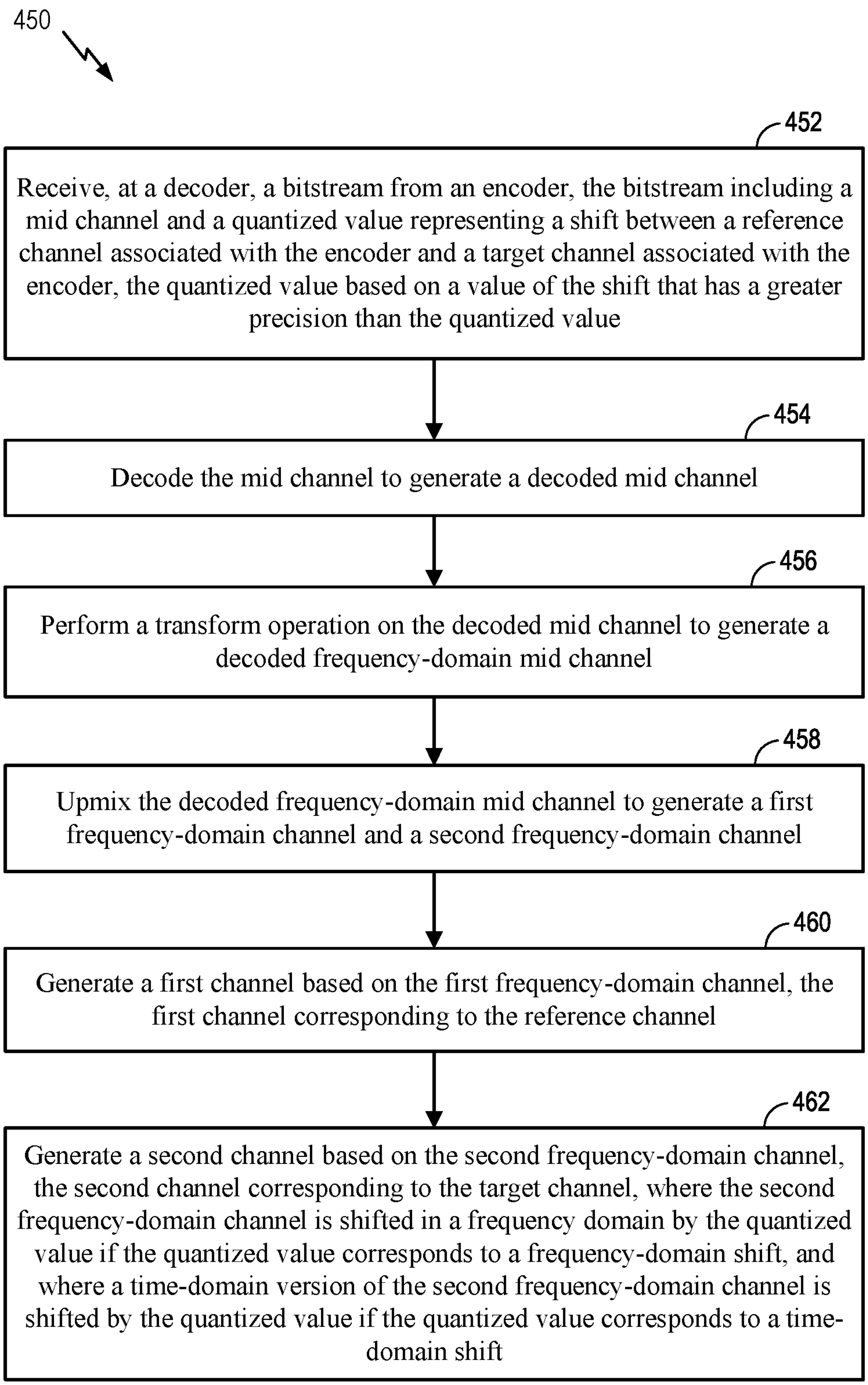
FIG. 4B is a non-limiting illustrative example of a more detailed version of the method of decoding the audio signal of FIG. 4A.

Referring to FIG. 4B, a method 450 of decoding a signal is shown. In some implementations, the method 450 of FIG. 4B is a more detailed version of the method 400 of decoding the audio signal of FIG. 4A. The method 450 may be performed by the second device 106 of FIG. 1, the decoder 118 of FIGS. 1 and 2, or both.

The method 450 includes receiving, at a decoder, a bitstream from an encoder, at 452. The bitstream includes a mid channel and a quantized value representing a shift between a reference channel associated with the encoder and a target channel associated with the encoder. The quantized value may be based on a value (e.g., an unquantized value) of the shift that has a greater precision than the quantized value. For example, referring to FIG. 1, the decoder 118 may receive the bitstream 160 from the encoder 114. The bitstream 160 may include the first portion of the mid channel 191 and the first quantized shift value 181 representing the shift between the first audio signal 130 (e.g., the reference channel) and the second audio signal 132 (e.g., the target channel). The first quantized shift value 181 may be based on the first shift value 180 (e.g., an unquantized value).

The first shift value 180 may have a greater precision than the first quantized shift value 181. For example, the first quantized shift value 181 may correspond to a low resolution version of the first shift value 180. The first shift value may be used by the encoder 114 to temporally match the target channel (e.g., the second audio signal 132) and the reference channel (e.g., the first audio signal 130).

The method 450 also includes decoding the mid channel to generate a decoded mid channel, at 454. For example, referring to FIG. 2, the mid channel decoder 202 may decode the first portion of the mid channel 191 to generate the first portion of the decoded mid channel 170. The method 400 may also include performing a transform operation on the decoded mid channel to generate a decoded frequency-domain mid channel, at 456. For example, referring to FIG. 2, the transform unit 204 may perform a transform operation on the first portion of the decoded mid channel 170 to generate the first portion of the frequency-domain decoded mid channel 171.

The method 450 may also include upmixing the decoded frequency-domain mid channel to generate a first portion of the frequency-domain channel and a second frequency-domain channel, at 458. For example, referring to FIG. 2, the upmixer 206 may upmix the first portion of the frequency-domain decoded mid channel 171 to generate the portion of the frequency-domain channel 250 and the portion of the frequency-domain channel 254. The method 450 may also include generating a first channel based on the first portion of the frequency-domain channel, at 460. The first channel may correspond to the reference channel. For example, the inverse transform unit 210 may perform an inverse transform operation on the portion of the frequency-domain channel 250 to generate the portion of the time-domain channel 260, and the shifter 214 may pass the portion of the time-domain channel 260 as a portion of the first output signal 126. The first output signal 126 may correspond to the reference channel (e.g., the first audio signal 130).

The method 450 may also include generating a second channel based on the second frequency-domain channel, at 462. The second channel may correspond to the target channel. According to one implementation, the second frequency-domain channel may be shifted in a frequency domain by the quantized value if the quantized value corresponds to a frequency-domain shift. For example, referring to FIG. 2, the upmixer 206 may shift the portion of the frequency-domain channel 254 by the first quantized frequency-domain shift value 281 to a second shifted frequency-domain channel (not shown). The inverse transform unit 212 unit may perform an inverse transform on the second shifted frequency-domain channel to generate a portion of the second output signal 128. The second output signal 128 may correspond to the target channel (e.g., the second audio signal 132).

According to another implementation, a time-domain version of the second frequency-domain channel may be shifted by the quantized value if the quantized value corresponds to a time-domain shift. For example, the inverse transform unit 212 may perform an inverse transform operation on the portion of the frequency-domain channel 254 to generate the portion of the time-domain channel 264. The shifter 214 may shift the portion of time-domain channel 264 by the first quantized time-domain shift value 291 to generate a portion of the second output signal 128. The second output signal 128 may correspond to the target channel (e.g., the second audio signal 132).

Thus, the method 450 of FIG. 4B may enable alignment of encoder-side channels to reduce coding entropy, and thus increase coding efficiency, because coding entropy is sensitive to shift changes between the channels. For example, the encoder 114 may use unquantized shift values to accurately align the channels because unquantized shift values have a relatively high resolution. Quantized shift values may be transmitted to the decoder 118 to reduce data transmission resource usage. At the decoder 118, the quantized shift parameters may be used to emulate a perceptible difference between the output signals 126, 128.

Figure 5A:
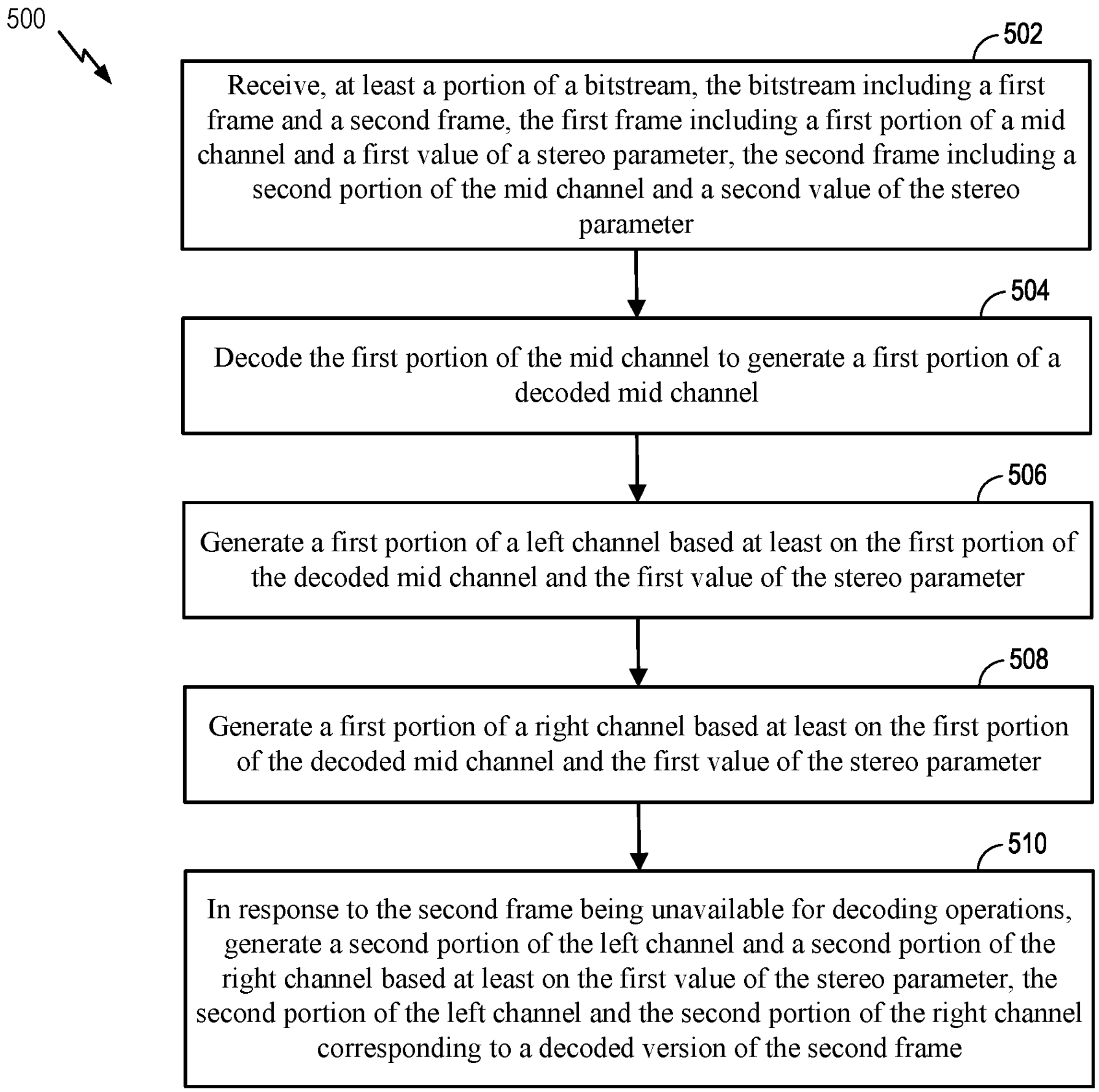
FIG. 5A is another non-limiting illustrative example of a method of decoding an audio signal.

Referring to FIG. 5A, another method 500 of decoding a signal is shown. The method 500 may be performed by the second device 106 of FIG. 1, the decoder 118 of FIGS. 1 and 2, or both.

The method 500 includes receiving at least a portion of a bitstream, at 502. The bitstream includes a first frame and a second frame. The first frame includes a first portion of a mid channel and a first value of a stereo parameter, and the second frame includes a second portion of the mid channel and a second value of the stereo parameter.

The method 500 also includes decoding the first portion of the mid channel to generate a first portion of a decoded mid channel, at 504. The method 500 further includes generating a first portion of a left channel based at least on the first portion of the decoded mid channel and the first value of the stereo parameter, at 506, and generating a first portion of a right channel based at least on the first portion of the decoded mid channel and the first value of the stereo parameter, at 508. The method also includes, in response to the second frame being unavailable for decoding operations, generating a second portion of the left channel and a second portion of the right channel based at least on the first value of the stereo parameter, at 510. The second portion of the left channel and the second portion of the right channel correspond to a decoded version of the second frame.

According to one implementation, the method 500 includes generating an interpolated value of the stereo parameter based on the first value of the stereo parameter and the second value of the stereo parameter in response to the second frame being available for the decoding operations. According to another implementation, the method 500 includes generating, in response to the second frame being unavailable for the decoding operations, at least the second portion of the left channel and the second portion of the right channel based at least on the first value of the stereo parameter, the first portion of the left channel, and the first portion of the right channel.

According to one implementation, the method 500 includes generating, in response to the second frame being unavailable for the decoding operations, at least the second portion of the mid channel and a second portion of a side channel based at least on the first value of the stereo parameter, the first portion of the mid channel, the first portion of the left channel, or the first portion of the right channel. The method 500 also includes generating, in response to the second frame being unavailable for the decoding operations, the second portion of the left channel and the second portion of the right channel based on the second portion of the mid channel, the second portion of the side channel, and a third value of the stereo parameter. The third value of the stereo parameter is at least based on the first value of the stereo parameter, an interpolated value of the stereo parameter, and a coding mode.

Thus, the method 500 may enable the decoder 118 to approximate stereo parameters (e.g., shift values) based on stereo parameters or variation in the stereo parameters from preceding frames. For example, the decoder 118 may extrapolate stereo parameters for frames that are lost during transmission (e.g., the second frame 192) from stereo parameters of one or more preceding frames.

Figure 5B:
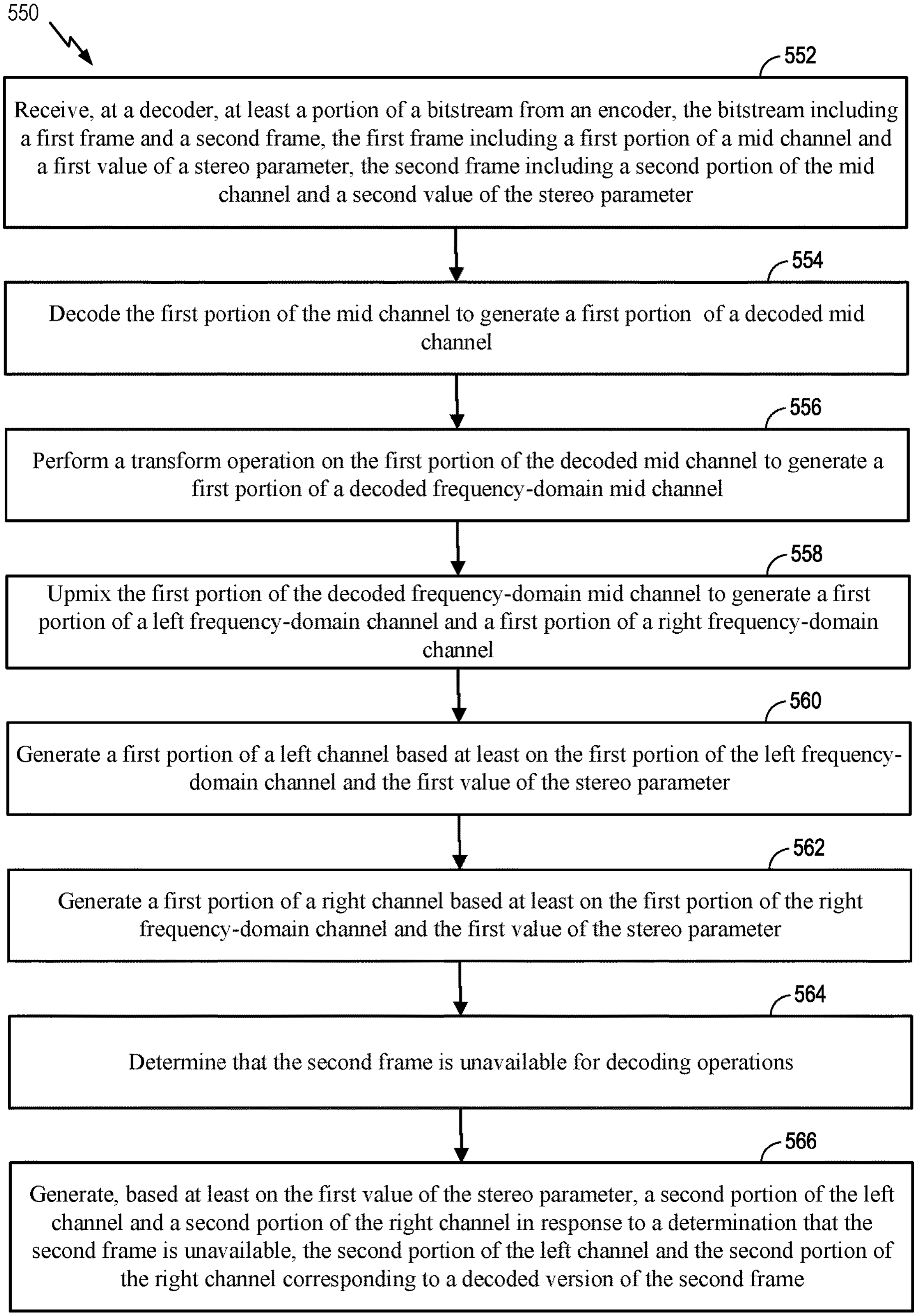
FIG. 5B is a non-limiting illustrative example of a more detailed version of the method of decoding the audio signal of FIG. 5A.

Referring to FIG. 5B, another method 550 of decoding a signal is shown. In some implementations, the method 550 of FIG. 5B is a more detailed version of the method 500 of decoding the audio signal of FIG. 5A. The method 550 may be performed by the second device 106 of FIG. 1, the decoder 118 of FIGS. 1 and 2, or both.

The method 550 includes receiving, at a decoder, at least a portion of a bitstream from an encoder, at 552. The bitstream includes a first frame and a second frame. The first frame includes a first portion of a mid channel and a first value of a stereo parameter, and the second frame includes a second portion of the mid channel and a second value of the stereo parameter. For example, referring to FIG. 1, the second device 106 may receive a portion of the bitstream 160 from the encoder 114. The bitstream includes the first frame 190 and the second frame 192. The first frame 190 includes the first portion of the mid channel 191, the first quantized shift value 181, and the first quantized stereo parameter 183. The second frame 192 includes the second portion of the mid channel 193, the second quantized shift value 185, and the second quantized stereo parameter 187.

The method 550 also includes decoding the first portion of the mid channel to generate a first portion of a decoded mid channel, at 554. For example, referring to FIG. 2, the mid channel decoder 202 may decode the first portion of the mid channel 191 to generate the first portion of the decoded mid channel 170. The method 550 may also include performing a transform operation on the first portion of the decoded mid channel to generate a first portion of a decoded frequency-domain mid channel, at 556. For example, referring to FIG. 2, the transform unit 204 may perform a transform operation on the first portion of the decoded mid channel 170 to generate the first portion of the frequency-domain decoded mid channel 171.

The method 550 may also include upmixing the first portion of the decoded frequency-domain mid channel to generate a first portion of a left frequency-domain channel and a first portion of a right frequency-domain channel, at 558. For example, referring to FIG. 1, the upmixer 206 may upmix the first portion of the frequency-domain decoded mid channel 171 to generate the frequency-domain channel 250 and the frequency-domain channel 254. As described herein, the frequency-domain channel 250 may be a left channel, and the frequency-domain channel 254 may be a right channel. However, in other implementations, the frequency-domain channel 250 may be a right channel, and the frequency-domain channel 254 may be a left channel.

The method 550 may also include generating a first portion of a left channel based at least on the first portion of the left frequency-domain channel the first value of the stereo parameter, at 560. For example, the upmixer 206 may use the first quantized stereo parameter 183 to generate the frequency-domain channel 250. The inverse transform unit 210 may perform an inverse transform operation on the frequency-domain channel 250 to generate the time-domain channel 260, and the shifter 214 may pass the time-domain channel 260 as the first output signal 126 (e.g., the first portion of the left channel according to the method 550).

The method 550 may also include generating a first portion of a right channel based at least on the first portion of the right frequency-domain channel and the first value of the stereo parameter, at 562. For example, the upmixer 206 may use the first quantized stereo parameter 183 to generate the frequency-domain channel 254. The inverse transform unit 212 may perform an inverse transform operation on the frequency-domain channel 254 to generate the time-domain channel 264, and the shifter 214 may pass (or selectively shift) the time-domain channel 264 as the second output signal 128 (e.g., the first portion of the right channel according to the method 550).

The method 550 also includes determining that the second frame is unavailable for decoding operations, at 564. For example, the decoder 118 may determine that one or more portions of the second frame 192 are unavailable for decoding operations. To illustrate, the second quantized shift value 185 and the second quantized stereo parameter 187 may be lost in transmission (from the first device 104 to the second device 106) based on poor transmission conditions. The method 550 also includes generating, based at least on the first value of the stereo parameter, a second portion of the left channel and a second portion of the right channel in response to determining that the second frame is unavailable, at 566. The second portion of the left channel and the second portion of the right channel may correspond to a decoded version of the second frame.

For example, the stereo parameter interpolator 208 may interpolate (or estimate) the second quantized shift value 185 based on the first quantized frequency-domain shift value 281. To illustrate, the stereo parameter interpolator 208 may generate the second interpolated frequency-domain shift value 285 based on the first quantized frequency-domain shift value 281. The stereo parameter interpolator 208 may also interpolate (or estimate) the second quantized stereo parameter 187 based on the first quantized stereo parameter 183. For example, the stereo parameter interpolator 208 may generate a second interpolated stereo parameter 287 based on the first quantized stereo parameter 183.

The upmixer 206 may upmix the second frequency-domain decoded mid channel 173 to generate the frequency-domain channel 252 and the frequency-domain channel 256. The upmixer 206 may apply the second interpolated stereo parameter 287 to the second frequency-domain decoded mid channel 173 during upmix operations to generate the frequency-domain channels 252, 256. According to the implementation where the first quantized shift value 181 includes a frequency-domain shift (e.g., the first quantized shift value 181 corresponds to a first quantized frequency-domain shift value 281), the upmixer 206 may perform a frequency-domain shift (e.g., a phase shift) based on the second interpolated frequency-domain shift value 285 to generate the frequency-domain channel 256.

The inverse transform unit 210 may perform an inverse transform operation on the frequency-domain channel 252 to generate the time-domain channel 262, and the inverse transform unit 212 may perform an inverse transform operation on the frequency-domain channel 256 to generate a time-domain channel 266. The shift value interpolator 216 may interpolate (or estimate) the second quantized shift value 185 based on the first quantized time-domain shift value 291. For example, the shift value interpolator 216 may generate the second interpolated time-domain shift value 295 based on the first quantized time-domain shift value 291. According to the implementation where the first quantized shift value 181 corresponds to the first quantized frequency-domain shift value 281, the shifter 214 may bypass shifting operations and pass the time-domain channels 262, 266 as the output signals 126, 128, respectively. According to the implementation where the first quantized shift value 181 corresponds to the first quantized time-domain shift value 291, the shifter 214 may shift the time-domain channel 266 by the second interpolated time-domain shift value 295 to generate the second output signal 128.

Thus, the method 550 may enable the decoder 118 to interpolate (or estimate) stereo parameters for frames that are lost during transmission (e.g., the second frame 192) based on stereo parameters for one or more preceding frames.

Figure 6:
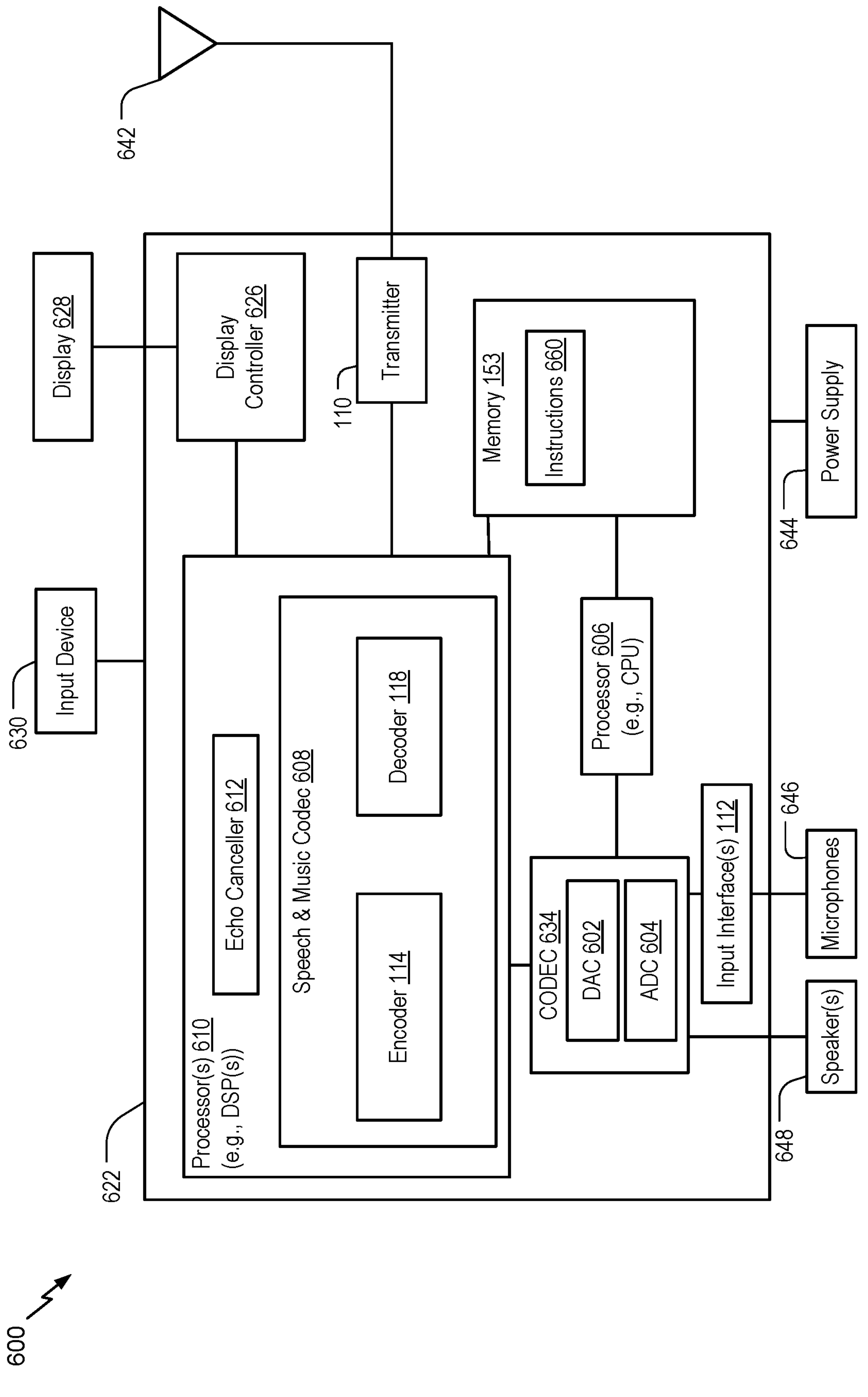
FIG. 6 is a block diagram of a particular illustrative example of a device that includes a decoder to estimate stereo parameters for missing frames and to decode audio signals using quantized stereo parameters.

Referring to FIG. 6, a block diagram of a particular illustrative example of a device (e.g., a wireless communication device) is depicted and generally designated 600. In various implementations, the device 600 may have fewer or more components than illustrated in FIG. 6. In an illustrative implementation, the device 600 may correspond to the first device 104 of FIG. 1, the second device 106 of FIG. 1, or a combination thereof. In an illustrative implementation, the device 600 may perform one or more operations described with reference to systems and methods of FIGS. 1-3, 4A, 4B, 5A, and 5B.

In a particular implementation, the device 600 includes a processor 606 (e.g., a central processing unit (CPU)). The device 600 may include one or more additional processors 610 (e.g., one or more digital signal processors (DSPs)). The processors 610 may include a media (e.g., speech and music) coder-decoder (CODEC) 608, and an echo canceller 612. The media CODEC 608 may include the decoder 118, the encoder 114, or a combination thereof.

The device 600 may include a memory 153 and a CODEC 634. Although the media CODEC 608 is illustrated as a component of the processors 610 (e.g., dedicated circuitry and/or executable programming code), in other implementations one or more components of the media CODEC 608, such as the decoder 118, the encoder 114, or a combination thereof, may be included in the processor 606, the CODEC 634, another processing component, or a combination thereof.

The device 600 may include the transmitter 110 coupled to an antenna 642. The device 600 may include a display 628 coupled to a display controller 626. One or more speakers 648 may be coupled to the CODEC 634. One or more microphones 646 may be coupled, via the input interface(s) 112, to the CODEC 634. In a particular implementation, the speakers 648 may include the first loudspeaker 142, the second loudspeaker 144 of FIG. 1, or a combination thereof. In a particular implementation, the microphones 646 may include the first microphone 146, the second microphone 148 of FIG. 1, or a combination thereof. The CODEC 634 may include a digital-to-analog converter (DAC) 602 and an analog-to-digital converter (ADC) 604.

The memory 153 may include instructions 660 executable by the processor 606, the processors 610, the CODEC 634, another processing unit of the device 600, or a combination thereof, to perform one or more operations described with reference to FIGS. 1-3, 4A, 4B, 5A, 5B. The instructions 660 may be executable to cause the a processor (e.g., the processor 606, the processors 606, the CODEC 634, the decoder 118, another processing unit of the device 600, or a combination thereof) to perform the method 400 of FIG. 4A, the method 450 of FIG. 4B, the method 500 of FIG. 5A, the method 550 of FIG. 5B, or a combination thereof. One or more components of the device 600 may be implemented via dedicated hardware (e.g., circuitry), by a processor executing instructions to perform one or more tasks, or a combination thereof. As an example, the memory 153 or one or more components of the processor 606, the processors 610, and/or the CODEC 634 may be a memory device, such as a random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). The memory device may include instructions (e.g., the instructions 660) that, when executed by a computer (e.g., a processor in the CODEC 634, the processor 606, and/or the processors 610), may cause the computer to perform one or more operations described with reference to FIGS. 1-3, 4A, 4B, 5A, 5B. As an example, the memory 153 or the one or more components of the processor 606, the processors 610, and/or the CODEC 634 may be a non-transitory computer-readable medium that includes instructions (e.g., the instructions 660) that, when executed by a computer (e.g., a processor in the CODEC 634, the processor 606, and/or the processors 610), cause the computer perform one or more operations described with reference to FIGS. 1-3, 4A, 4B, 5A, 5B.

In a particular implementation, the device 600 may be included in a system-in-package or system-on-chip device (e.g., a mobile station modem (MSM)) 622. In a particular implementation, the processor 606, the processors 610, the display controller 626, the memory 153, the CODEC 634, and the transmitter 110 are included in a system-in-package or the system-on-chip device 622. In a particular implementation, an input device 630, such as a touchscreen and/or keypad, and a power supply 644 are coupled to the system-on-chip device 622. Moreover, in a particular implementation, as illustrated in FIG. 6, the display 628, the input device 630, the speakers 648, the microphones 646, the antenna 642, and the power supply 644 are external to the system-on-chip device 622. However, each of the display 628, the input device 630, the speakers 648, the microphones 646, the antenna 642, and the power supply 644 can be coupled to a component of the system-on-chip device 622, such as an interface or a controller.

The device 600 may include a wireless telephone, a mobile communication device, a mobile phone, a smart phone, a cellular phone, a laptop computer, a desktop computer, a computer, a tablet computer, a set top box, a personal digital assistant (PDA), a display device, a television, a gaming console, a music player, a radio, a video player, an entertainment unit, a communication device, a fixed location data unit, a personal media player, a digital video player, a digital video disc (DVD) player, a tuner, a camera, a navigation device, a decoder system, an encoder system, or any combination thereof.

In a particular implementation, one or more components of the systems and devices disclosed herein may be integrated into a decoding system or apparatus (e.g., an electronic device, a CODEC, or a processor therein), into an encoding system or apparatus, or both. In other implementations, one or more components of the systems and devices disclosed herein may be integrated into a wireless telephone, a tablet computer, a desktop computer, a laptop computer, a set top box, a music player, a video player, an entertainment unit, a television, a game console, a navigation device, a communication device, a personal digital assistant (PDA), a fixed location data unit, a personal media player, or another type of device.

In conjunction with the techniques described herein, a first apparatus includes means for receiving a bitstream. The bitstream includes a mid channel and a quantized value representing a shift between a reference channel associated with an encoder and a target channel associated with the encoder. The quantized value is based on a value of the shift. The value is associated with the encoder and having a greater precision than the quantized value. For example, the means for receiving the bitstream may include the second device 106 of FIG. 1, a receiver (not shown) of the second device 106, the decoder 118 of FIG. 1, 2, or 6, the antenna 642 of FIG. 6, one or more other circuits, devices, components, modules, or a combination thereof.

The first apparatus may also include means for decoding the mid channel to generate a decoded mid channel. For example, the means for decoding the mid channel may include the decoder 118 of FIG. 1, 2, or 6, the mid channel decoder 202 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The first apparatus may also include means for generating a first channel based on the decoded mid channel. The first channel corresponds to the reference channel. For example, the means for generating the first channel may include the decoder 118 of FIG. 1, 2, or 6, the inverse transform unit 210 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The first apparatus may also include means for generating a second channel based on the decoded mid channel and the quantized value. The second channel corresponds to the target channel. The means for generating the second channel may include the decoder 118 of FIG. 1, 2, or 6, the inverse transform unit 212 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

In conjunction with the techniques described herein, a second apparatus includes means for receiving a bitstream from an encoder. The bitstream may include a mid channel and a quantized value representing a shift between a reference channel associated with the encoder and a target channel associated with the encoder. The quantized value may be based on a value of the shift that has a greater precision than the quantized value. For example, the means for receiving the bitstream may include the second device 106 of FIG. 1, a receiver (not shown) of the second device 106, the decoder 118 of FIG. 1, 2, or 6, the antenna 642 of FIG. 6, one or more other circuits, devices, components, modules, or a combination thereof.

The second apparatus may also include means for decoding the mid channel to generate a decoded mid channel. For example, the means for decoding the mid channel may include the decoder 118 of FIG. 1, 2, or 6, the mid channel decoder 202 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The second apparatus may also include means for performing a transform operation on the decoded mid channel to generate a decoded frequency-domain mid channel. For example, the means for performing the transform operation may include the decoder 118 of FIG. 1, 2, or 6, the transform unit 204 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The second apparatus may also include means for upmixing the decoded frequency-domain mid channel to generate a first frequency-domain channel and a second frequency-domain channel. For example, the means for upmixing may include the decoder 118 of FIG. 1, 2, or 6, the upmixer 206 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The second apparatus may also include means for generating a first channel based on the first frequency-domain channel. The first channel may correspond to the reference channel. For example, the means for generating the first channel may include the decoder 118 of FIG. 1, 2, or 6, the inverse transform unit 210 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The second apparatus may also include means for generating a second channel based on the second frequency-domain channel. The second channel may correspond to the target channel. If the quantized value corresponds to a frequency-domain shift, the second frequency-domain channel may be shifted in a frequency domain by the quantized value. If the quantized value corresponds to a time-domain shift, a time-domain version of the second frequency-domain channel may be shifted by the quantized value. The means for generating the second channel may include the decoder 118 of FIG. 1, 2, or 6, the inverse transform unit 212 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

In conjunction with the techniques described herein, a third apparatus includes means for receiving at least a portion of a bitstream. The bitstream includes a first frame and a second frame. The first frame includes a first portion of a mid channel and a first value of a stereo parameter, and the second frame includes a second portion of the mid channel and a second value of the stereo parameter. The means for receiving may include the second device 106 of FIG. 1, a receiver (not shown) of the second device 106, the decoder 118 of FIG. 1, 2, or 6, the antenna 642 of FIG. 6, one or more other circuits, devices, components, modules, or a combination thereof.

The third apparatus may also include means for decoding the first portion of the mid channel to generate a first portion of a decoded mid channel. For example, the means for decoding may include the decoder 118 of FIG. 1, 2, or 6, the mid channel decoder 202 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The third apparatus may also include means for generating a first portion of a left channel based at least on the first portion of the decoded mid channel and the first value of the stereo parameter. For example, the means for generating the first portion of the left channel may include the decoder 118 of FIG. 1, 2, or 6, the inverse transform unit 210 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The third apparatus may also include means for generating a first portion of a right channel based at least on the first portion of the decoded mid channel and the first value of the stereo parameter. For example, the means for generating the first portion of the right channel may include the decoder 118 of FIG. 1, 2, or 6, the inverse transform unit 212 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The third apparatus may also include means for generating, in response to the second frame being unavailable for decoding operations, a second portion of the left channel and a second portion of the right channel based at least on the first value of the stereo parameter. The second portion of the left channel and the second portion of the right channel correspond to a decoded version of the second frame. The means for generating the second portion of the left channel and the second portion of the right channel may include the decoder 118 of FIG. 1, 2, or 6, the stereo the shift value interpolator 216 of FIG. 2, the stereo parameter interpolator 208 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

In conjunction with the techniques described herein, a fourth apparatus includes means for receiving at least a portion of a bitstream from an encoder. The bitstream may include a first frame and a second frame. The first frame may include a first portion of a mid channel and a first value of a stereo parameter, and the second frame may include a second portion of the mid channel and a second value of the stereo parameter. The means for receiving may include the second device 106 of FIG. 1, a receiver (not shown) of the second device 106, the decoder 118 of FIG. 1, 2, or 6, the antenna 642 of FIG. 6, one or more other circuits, devices, components, modules, or a combination thereof.

The fourth apparatus may also include means for decoding the first portion of the mid channel to generate a first portion of a decoded mid channel. For example, the means for decoding the first portion of the mid channel may include the decoder 118 of FIG. 1, 2, or 6, the mid channel decoder 202 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The fourth apparatus may also include means for performing a transform operation on the first portion of the decoded mid channel to generate a first portion of a decoded frequency-domain mid channel. For example, the means for performing the transform operation may include the decoder 118 of FIG. 1, 2, or 6, the transform unit 204 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The fourth apparatus may also include means for upmixing the first portion of the decoded frequency-domain mid channel to generate a first portion of a left frequency-domain channel and a first portion of a right frequency-domain channel. For example, the means for upmixing may include the decoder 118 of FIG. 1, 2, or 6, the upmixer 206 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The fourth apparatus may also include means for generating a first portion of a left channel based at least on the first portion of the left frequency-domain channel and the first value of the stereo parameter. For example, the means for generating the first portion of the left channel may include the decoder 118 of FIG. 1, 2, or 6, the inverse transform unit 210 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The fourth apparatus may also include means for generating a first portion of a right channel based at least on the first portion of the right frequency-domain channel and the first value of the stereo parameter. For example, the means for generating the first portion of the right channel may include the decoder 118 of FIG. 1, 2, or 6, the inverse transform unit 212 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

The fourth apparatus may also include means for generating, based at least on the first value of the stereo parameter, a second portion of the left channel and a second portion of the right channel in response to a determination that the second frame is unavailable. The second portion of the left channel and the second portion of the right channel may correspond to a decoded version of the second frame. The means for generating the second portion of the left channel and the second portion of the right channel may include the decoder 118 of FIG. 1, 2, or 6, the stereo the shift value interpolator 216 of FIG. 2, the stereo parameter interpolator 208 of FIG. 2, the shifter 214 of FIG. 2, the processor 606 of FIG. 6, the processors 610 of FIG. 6, the CODEC 634 of FIG. 6, the instructions 660 of FIG. 6, executable by a processor, one or more other circuits, devices, components, modules, or a combination thereof.

It should be noted that various functions performed by the one or more components of the systems and devices disclosed herein are described as being performed by certain components or modules. This division of components and modules is for illustration only. In an alternate implementation, a function performed by a particular component or module may be divided amongst multiple components or modules. Moreover, in an alternate implementation, two or more components or modules may be integrated into a single component or module. Each component or module may be implemented using hardware (e.g., a field-programmable gate array (FPGA) device, an application-specific integrated circuit (ASIC), a DSP, a controller, etc.), software (e.g., instructions executable by a processor), or any combination thereof.

Figure 7:
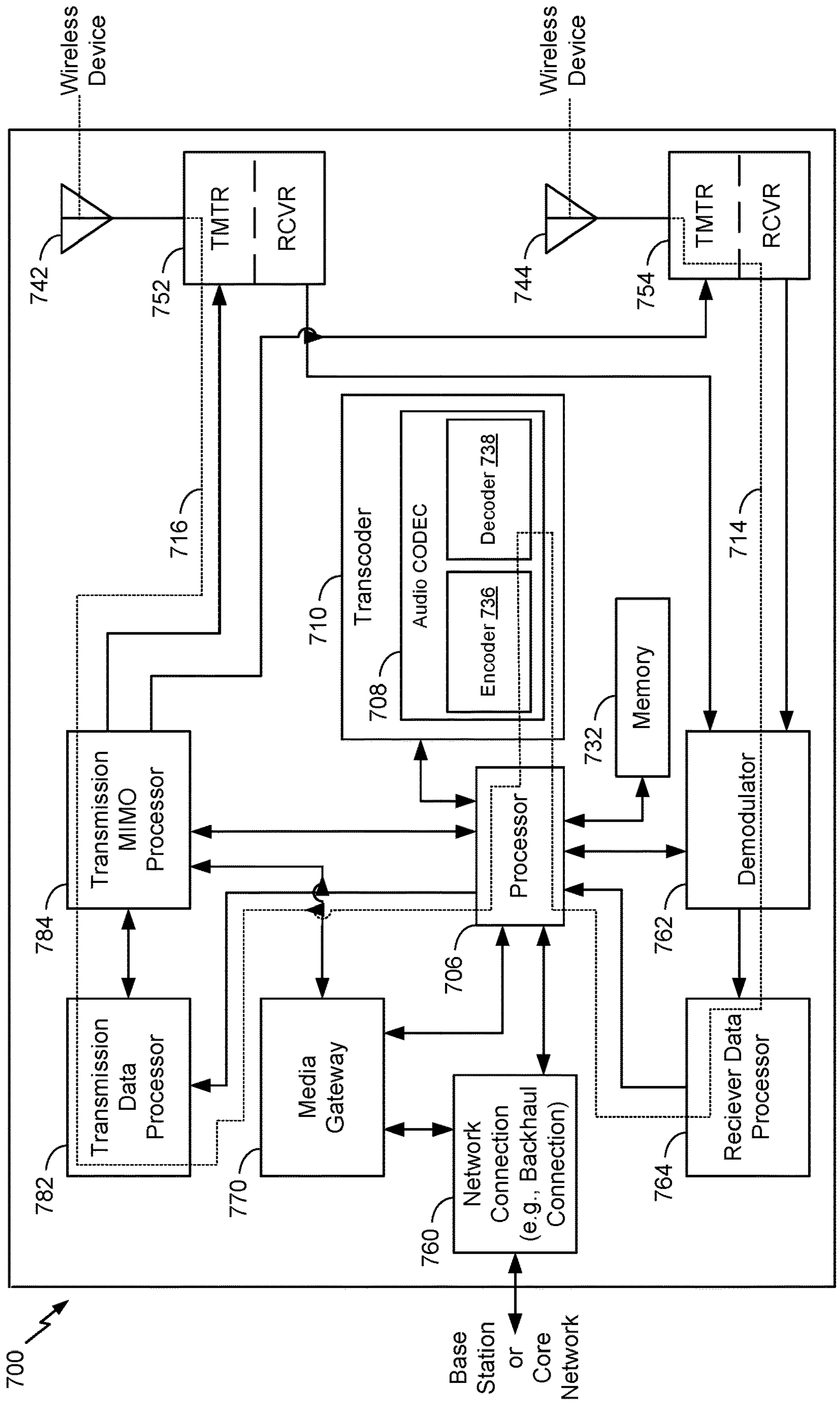
FIG. 7 is a block diagram of a base station that is operable to estimate stereo parameters for missing frames and to decode audio signals using quantized stereo parameters.

Referring to FIG. 7, a block diagram of a particular illustrative example of a base station 700 is depicted. In various implementations, the base station 700 may have more components or fewer components than illustrated in FIG. 7. In an illustrative example, the base station 700 may include the second device 106 of FIG. 1. In an illustrative example, the base station 700 may operate according to one or more of the methods or systems described with reference to FIGS. 1-3, 4A, 4B, 5A, 5B, and 6.

The base station 700 may be part of a wireless communication system. The wireless communication system may include multiple base stations and multiple wireless devices. The wireless communication system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA.

The wireless devices may also be referred to as user equipment (UE), a mobile station, a terminal, an access terminal, a subscriber unit, a station, etc. The wireless devices may include a cellular phone, a smartphone, a tablet, a wireless modem, a personal digital assistant (PDA), a handheld device, a laptop computer, a smartbook, a netbook, a tablet, a cordless phone, a wireless local loop (WLL) station, a Bluetooth device, etc. The wireless devices may include or correspond to the device 600 of FIG. 6.

Various functions may be performed by one or more components of the base station 700 (and/or in other components not shown), such as sending and receiving messages and data (e.g., audio data). In a particular example, the base station 700 includes a processor 706 (e.g., a CPU). The base station 700 may include a transcoder 710. The transcoder 710 may include an audio CODEC 708. For example, the transcoder 710 may include one or more components (e.g., circuitry) configured to perform operations of the audio CODEC 708. As another example, the transcoder 710 may be configured to execute one or more computer-readable instructions to perform the operations of the audio CODEC 708. Although the audio CODEC 708 is illustrated as a component of the transcoder 710, in other examples one or more components of the audio CODEC 708 may be included in the processor 706, another processing component, or a combination thereof. For example, a decoder 738 (e.g., a vocoder decoder) may be included in a receiver data processor 764. As another example, an encoder 736 (e.g., a vocoder encoder) may be included in a transmission data processor 782. The encoder 736 may include the encoder 114 of FIG. 1. The decoder 738 may include the decoder 118 of FIG. 1.

The transcoder 710 may function to transcode messages and data between two or more networks. The transcoder 710 may be configured to convert message and audio data from a first format (e.g., a digital format) to a second format. To illustrate, the decoder 738 may decode encoded signals having a first format and the encoder 736 may encode the decoded signals into encoded signals having a second format. Additionally or alternatively, the transcoder 710 may be configured to perform data rate adaptation. For example, the transcoder 710 may down-convert a data rate or up-convert the data rate without changing a format the audio data. To illustrate, the transcoder 710 may down-convert 64 kbit/s signals into 16 kbit/s signals.

The base station 700 may include a memory 732. The memory 732, such as a computer-readable storage device, may include instructions. The instructions may include one or more instructions that are executable by the processor 706, the transcoder 710, or a combination thereof, to perform one or more operations described with reference to the methods and systems of FIGS. 1-3, 4A, 4B, 5A, 5B, 6.

The base station 700 may include multiple transmitters and receivers (e.g., transceivers), such as a first transceiver 752 and a second transceiver 754, coupled to an array of antennas. The array of antennas may include a first antenna 742 and a second antenna 744. The array of antennas may be configured to wirelessly communicate with one or more wireless devices, such as the device 600 of FIG. 6. For example, the second antenna 744 may receive a data stream 714 (e.g., a bit stream) from a wireless device. The data stream 714 may include messages, data (e.g., encoded speech data), or a combination thereof.

The base station 700 may include a network connection 760, such as backhaul connection. The network connection 760 may be configured to communicate with a core network or one or more base stations of the wireless communication network. For example, the base station 700 may receive a second data stream (e.g., messages or audio data) from a core network via the network connection 760. The base station 700 may process the second data stream to generate messages or audio data and provide the messages or the audio data to one or more wireless device via one or more antennas of the array of antennas or to another base station via the network connection 760. In a particular implementation, the network connection 760 may be a wide area network (WAN) connection, as an illustrative, non-limiting example. In some implementations, the core network may include or correspond to a Public Switched Telephone Network (PSTN), a packet backbone network, or both.

The base station 700 may include a media gateway 770 that is coupled to the network connection 760 and the processor 706. The media gateway 770 may be configured to convert between media streams of different telecommunications technologies. For example, the media gateway 770 may convert between different transmission protocols, different coding schemes, or both. To illustrate, the media gateway 770 may convert from PCM signals to Real-Time Transport Protocol (RTP) signals, as an illustrative, non-limiting example. The media gateway 770 may convert data between packet switched networks (e.g., a Voice Over Internet Protocol (VoIP) network, an IP Multimedia Subsystem (IMS), a fourth generation (4G) wireless network, such as LTE, WiMax, and UMB, etc.), circuit switched networks (e.g., a PSTN), and hybrid networks (e.g., a second generation (2G) wireless network, such as GSM, GPRS, and EDGE, a third generation (3G) wireless network, such as WCDMA, EV-DO, and HSPA, etc.).

Additionally, the media gateway 770 may include a transcoder, such as the transcoder 710, and may be configured to transcode data when codecs are incompatible. For example, the media gateway 770 may transcode between an Adaptive Multi-Rate (AMR) codec and a G.711 codec, as an illustrative, non-limiting example. The media gateway 770 may include a router and a plurality of physical interfaces. In some implementations, the media gateway 770 may also include a controller (not shown). In a particular implementation, the media gateway controller may be external to the media gateway 770, external to the base station 700, or both. The media gateway controller may control and coordinate operations of multiple media gateways. The media gateway 770 may receive control signals from the media gateway controller and may function to bridge between different transmission technologies and may add service to end-user capabilities and connections.

The base station 700 may include a demodulator 762 that is coupled to the transceivers 752, 754, the receiver data processor 764, and the processor 706, and the receiver data processor 764 may be coupled to the processor 706. The demodulator 762 may be configured to demodulate modulated signals received from the transceivers 752, 754 and to provide demodulated data to the receiver data processor 764. The receiver data processor 764 may be configured to extract a message or audio data from the demodulated data and send the message or the audio data to the processor 706.

The base station 700 may include a transmission data processor 782 and a transmission multiple input-multiple output (MIMO) processor 784. The transmission data processor 782 may be coupled to the processor 706 and the transmission MIMO processor 784. The transmission MIMO processor 784 may be coupled to the transceivers 752, 754 and the processor 706. In some implementations, the transmission MIMO processor 784 may be coupled to the media gateway 770. The transmission data processor 782 may be configured to receive the messages or the audio data from the processor 706 and to code the messages or the audio data based on a coding scheme, such as CDMA or orthogonal frequency-division multiplexing (OFDM), as an illustrative, non-limiting examples. The transmission data processor 782 may provide the coded data to the transmission MIMO processor 784.

The coded data may be multiplexed with other data, such as pilot data, using CDMA or OFDM techniques to generate multiplexed data. The multiplexed data may then be modulated (i.e., symbol mapped) by the transmission data processor 782 based on a particular modulation scheme (e.g., Binary phase-shift keying ("BPSK"), Quadrature phase-shift keying ("QSPK"), M-ary phase-shift keying ("M-PSK"), M-ary Quadrature amplitude modulation ("M-QAM"), etc.) to generate modulation symbols. In a particular implementation, the coded data and other data may be modulated using different modulation schemes. The data rate, coding, and modulation for each data stream may be determined by instructions executed by processor 706.

The transmission MIMO processor 784 may be configured to receive the modulation symbols from the transmission data processor 782 and may further process the modulation symbols and may perform beamforming on the data. For example, the transmission MIMO processor 784 may apply beamforming weights to the modulation symbols.

During operation, the second antenna 744 of the base station 700 may receive a data stream 714. The second transceiver 754 may receive the data stream 714 from the second antenna 744 and may provide the data stream 714 to the demodulator 762. The demodulator 762 may demodulate modulated signals of the data stream 714 and provide demodulated data to the receiver data processor 764. The receiver data processor 764 may extract audio data from the demodulated data and provide the extracted audio data to the processor 706.

The processor 706 may provide the audio data to the transcoder 710 for transcoding. The decoder 738 of the transcoder 710 may decode the audio data from a first format into decoded audio data and the encoder 736 may encode the decoded audio data into a second format. In some implementations, the encoder 736 may encode the audio data using a higher data rate (e.g., up-convert) or a lower data rate (e.g., down-convert) than received from the wireless device. In other implementations the audio data may not be transcoded. Although transcoding (e.g., decoding and encoding) is illustrated as being performed by a transcoder 710, the transcoding operations (e.g., decoding and encoding) may be performed by multiple components of the base station 700. For example, decoding may be performed by the receiver data processor 764 and encoding may be performed by the transmission data processor 782. In other implementations, the processor 706 may provide the audio data to the media gateway 770 for conversion to another transmission protocol, coding scheme, or both. The media gateway 770 may provide the converted data to another base station or core network via the network connection 760.

Encoded audio data generated at the encoder 736 may be provided to the transmission data processor 782 or the network connection 760 via the processor 706. The transcoded audio data from the transcoder 710 may be provided to the transmission data processor 782 for coding according to a modulation scheme, such as OFDM, to generate the modulation symbols. The transmission data processor 782 may provide the modulation symbols to the transmission MIMO processor 784 for further processing and beamforming. The transmission MIMO processor 784 may apply beamforming weights and may provide the modulation symbols to one or more antennas of the array of antennas, such as the first antenna 742 via the first transceiver 752. Thus, the base station 700 may provide a transcoded data stream 716, that corresponds to the data stream 714 received from the wireless device, to another wireless device. The transcoded data stream 716 may have a different encoding format, data rate, or both, than the data stream 714. In other implementations, the transcoded data stream 716 may be provided to the network connection 760 for transmission to another base station or a core network.

Those of skill would further appreciate that the various illustrative logical blocks, configurations, modules, circuits, and algorithm steps described in connection with the implementations disclosed herein may be implemented as electronic hardware, computer software executed by a processing device such as a hardware processor, or combinations of both. Various illustrative components, blocks, configurations, modules, circuits, and steps have been described above generally in terms of their functionality. Whether such functionality is implemented as hardware or executable software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the implementations disclosed herein may be embodied directly in hardware, in a software module executed by a processor, or in a combination of the two. A software module may reside in a memory device, such as random access memory (RAM), magnetoresistive random access memory (MRAM), spin-torque transfer MRAM (STT-MRAM), flash memory, read-only memory (ROM), programmable read-only memory (PROM), erasable programmable read-only memory (EPROM), electrically erasable programmable read-only memory (EEPROM), registers, hard disk, a removable disk, or a compact disc read-only memory (CD-ROM). An exemplary memory device is coupled to the processor such that the processor can read information from, and write information to, the memory device. In the alternative, the memory device may be integral to the processor. The processor and the storage medium may reside in an application-specific integrated circuit (ASIC). The ASIC may reside in a computing device or a user terminal. In the alternative, the processor and the storage medium may reside as discrete components in a computing device or a user terminal.

The previous description of the disclosed implementations is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:

a receiver configured to receive at least a portion of a bitstream, the bitstream comprising a first frame and a second frame, the first frame including a first portion of a mid channel and a first parameter, the second frame including a second portion of the mid channel and a second parameter; and a decoder configured to:

generate a first portion of a channel based at least on the first portion of the mid channel and the first parameter; and in response to the second frame being unavailable for decoding operations, estimate the second parameter by interpolating the first parameter; generate a second portion of the channel based on stereo parameters of one or more preceding frames, the second portion of the channel corresponding to a representation of the second frame, wherein the stereo parameters of the one or more preceding frames include the first parameter, wherein the second portion of the channel is also based at least on the estimated second parameter.

2. The apparatus of claim 1, wherein the decoder is configured to:

in response to the second frame being unavailable for decoding operations, estimate the second parameter by extrapolating the first parameter; and generate the second portion of the channel based at least on the estimated second parameter.

3. The apparatus of claim 1, wherein the decoder is further configured to:

decode the first portion of the mid channel to generate a first portion of a decoded mid channel;

perform a transform operation on the first portion of the decoded mid channel to generate a first portion of a decoded frequency-domain mid channel;

upmix the first portion of the decoded frequency-domain mid channel based on the first parameter to generate a first portion of a left frequency-domain channel and a first portion of a right frequency-domain channel;

perform a first time-domain operation on the first portion of the left frequency-domain channel to generate a first portion of a left channel; and perform a second time-domain operation on the first portion of the right frequency-domain channel to generate a first portion of a right channel, wherein the first portion of the channel includes the first portion of the left channel or the first portion of the right channel.

4. The apparatus of claim 3, wherein, in response to the second frame being unavailable for the decoding operations, the decoder is configured to:

generate the second portion of the mid channel and a second portion of a side channel based at least on the stereo parameters of the one or more preceding frames;

perform a second transform operation on the second portion of the mid channel to generate a second portion of the decoded frequency-domain mid channel;

upmix the second portion of the decoded frequency-domain mid channel to generate a second portion of the left frequency-domain channel and a second portion of the right frequency-domain channel;

perform a third time-domain operation on the second portion of the left frequency-domain channel to generate a second portion of the left channel; and perform a fourth time-domain operation on the second portion of the right frequency-domain channel to generate a second portion of the right channel, wherein the second portion of the channel includes second portion of the left channel or the second portion of the right channel.

5. The apparatus of claim 4, wherein the decoder is configured to, in response to the second frame being unavailable for decoding operations, estimate the second parameter based on the stereo parameters of the one or more preceding frames, and wherein the estimated second parameter is used to upmix the second portion of the decoded frequency-domain mid channel.

6. The apparatus of claim 4, wherein the decoder is configured to perform an interpolation operation on the first portion of the decoded mid channel to generate the second portion of the decoded mid channel.

7. The apparatus of claim 1, wherein the first parameter is a quantized value representing a shift between a reference channel associated with an encoder and a target channel associated with the encoder, the quantized value based on a value of the shift, the value of the shift associated with the encoder and having a greater precision than the quantized value.

8. The apparatus of claim 1, wherein the first parameter is a first quantized value having a lower resolution than a first stereo parameter, and wherein the second parameter is a second quantized value having a lower resolution than a second stereo parameter.

9. The apparatus of claim 8, wherein the first stereo parameter and the second stereo parameter comprise an inter-channel phase difference parameter or an inter-channel level difference parameter.

10. The apparatus of claim 8, wherein the first stereo parameter and the second stereo parameter comprise an inter-channel time difference parameter.

11. The apparatus of claim 8, wherein the first stereo parameter and the second stereo parameter comprise an inter-channel correlation parameter.

12. The apparatus of claim 8, wherein the first stereo parameter and the second stereo parameter comprise a spectral tilt parameter.

13. The apparatus of claim 8, wherein the first stereo parameter and the second stereo parameter comprise an inter-channel gain parameter.

14. The apparatus of claim 8, wherein the first stereo parameter and the second stereo parameter comprise an inter-channel voicing parameter.

15. The apparatus of claim 1, wherein the receiver and the decoder are integrated into a mobile device or a base station.

16. A method comprising:

receiving, at a decoder, at least a portion of a bitstream, the bitstream comprising a first frame and a second frame, the first frame including a first portion of a mid channel and a first parameter, the second frame including a second portion of the mid channel and a second parameter;

generating a first portion of a channel based at least on the first portion of the mid channel and the first parameter; and in response to the second frame being unavailable for decoding operations, estimating the second parameter by interpolating the first parameter; generating a second portion of the channel based on stereo parameters of one or more preceding frames, the second portion of the channel corresponding to a representation of the second frame, wherein the stereo parameters of the one or more preceding frames include the first parameter, wherein the second portion of the channel is also based at least on the estimated second parameter.

17. The method of claim 16, wherein the first parameter and the second parameter comprise an inter-channel pitch parameter.

* * * * *